(12) United States Patent
Hoo et al.

(10) Patent No.: US 7,773,690 B2
(45) Date of Patent: *Aug. 10, 2010

(54) ANGLE ESTIMATION FOR SPACE-TIME BLOCK CODE (STBC) MODULATED SIGNAL

(75) Inventors: Min Chuin Hoo, Mountain View, CA (US); Rajendra Tushar Moorti, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 614 days.

This patent is subject to a terminal disclaimer.

(21) Appl. No.: 11/821,876

(22) Filed: Jun. 26, 2007

(65) Prior Publication Data

US 2008/0159424 A1    Jul. 3, 2008

Related U.S. Application Data

(63) Continuation-in-part of application No. 11/364,637, filed on Feb. 28, 2006, now Pat. No. 7,643,578.

(60) Provisional application No. 60/701,073, filed on Jul. 20, 2005, provisional application No. 60/933,928, filed on Jun. 8, 2007.

(51) Int. Cl.
*H04L 27/00* (2006.01)

(52) U.S. Cl. .............. 375/295; 370/203; 370/206; 370/208; 370/335; 370/491; 375/232; 375/260; 375/316; 375/341; 375/343; 375/347; 455/403; 455/423

(58) Field of Classification Search .......... 375/260, 375/295, 232, 316, 341, 343, 347
See application file for complete search history.

(56) References Cited

U.S. PATENT DOCUMENTS

| | | | | |
|---|---|---|---|---|
| 5,666,352 A | * | 9/1997 | Ohgoshi et al. | 370/206 |
| 7,133,473 B1 | * | 11/2006 | Lou et al. | 375/341 |
| 7,418,039 B2 | * | 8/2008 | Simmonds | 375/260 |

* cited by examiner

*Primary Examiner*—Shuwang Liu
*Assistant Examiner*—Dhaval Patel
(74) *Attorney, Agent, or Firm*—Garlick Harrison & Markison; Shayne X. Short

(57) ABSTRACT

Angle estimation for modulated signal. A novel compensation technique is presented by which angle estimation may be performed for a modulated signal. More specifically, the angle between a constellation corresponding to a received signal and a constellation corresponding to a received signal may be very efficiently estimated using any one of the possible embodiments corresponding to various aspects of the invention. After this angle has been estimated, the received signal or the expected constellation may be rotated (or de-rotated) to compensate for this angular difference. In doing so, better estimates of the information bits that are demodulated and decoded from the received signal may be made. This approach may be implemented and adapted to any of a wide variety of communication systems including, but not limited to, single-input-multiple-output (SISO), single-input-multiple-output (SIMO), multiple-input-single-output (MISO), multiple-input-multiple-output (MIMO), and even space-time block code (STBC) communication systems or other communication systems.

35 Claims, 14 Drawing Sheets

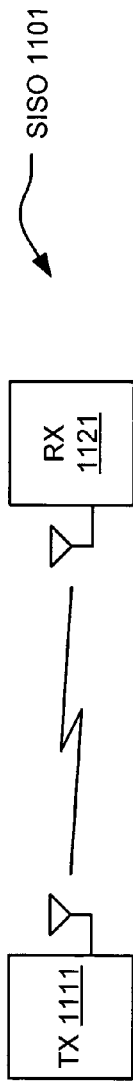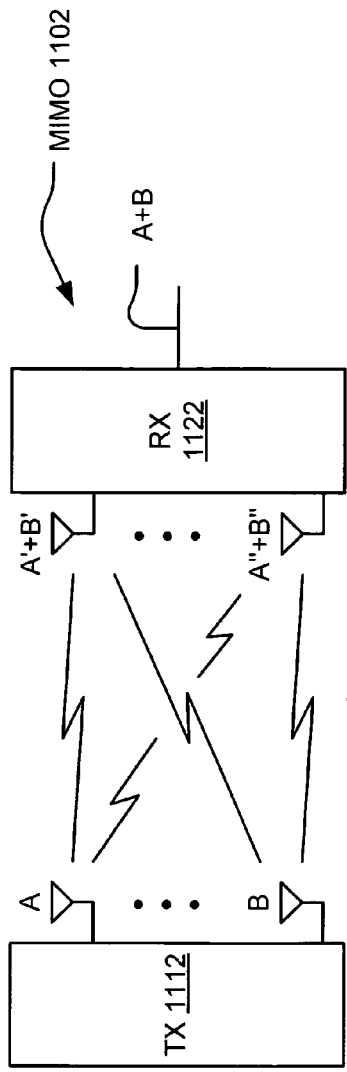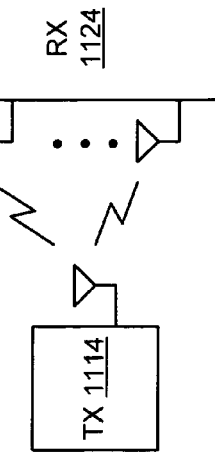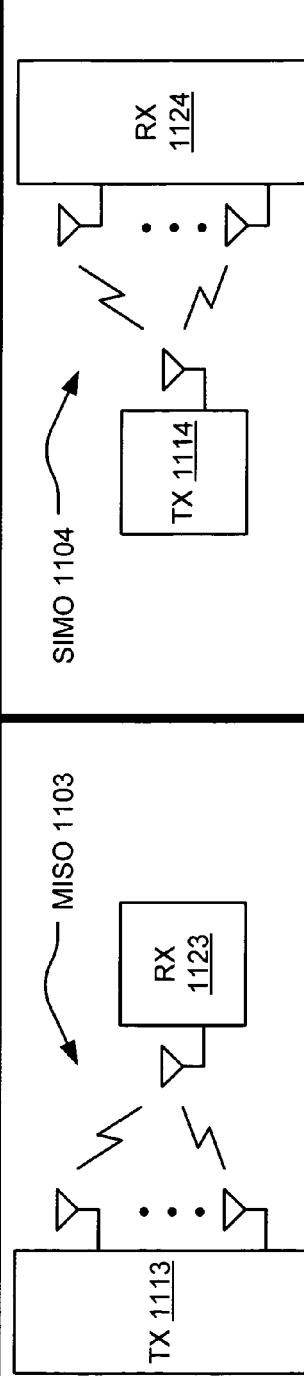

ANGLE ESTIMATION FOR SPACE-TIME BLOCK CODE (STBC) MODULATED SIGNAL

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 60/933,928, entitled "Angle estimation for space-time block code (STBC) modulated signal," filed Jun. 8, 2007.

Continuation-in-Part (CIP) Priority Claim, 35 U.S.C. §120

The present U.S. Utility Patent Application also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purpose:

1. U.S. application Ser. No. 11/364,637, entitled "Angle estimation for modulated signal," filed Feb. 28, 2006, now U.S. Pat. No. 7,643,578, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/701,073, entitled "Angle estimation for modulated signal," filed Jul. 20, 2005.

Incorporation by Reference

The following U.S. Utility Patent Application is hereby incorporated herein by reference in its entirety and made part of the present U.S. Utility Patent Application for all purposes:

1. U.S. patent application Ser. No. 11/168,793, entitled "Reduced feedback for beamforming in a wireless communication," filed Jun. 28, 2005, pending.

BACKGROUND OF THE INVENTION

1. Technical Field of the Invention

The invention relates generally to communication systems; and, more particularly, it relates to processing of a modulated signal that is received within such a communication system.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

One of the possible deleterious effects that may arise within such communication systems includes that of an angular rotation, or angular error, between a constellation corresponding to a received signal and a constellation corresponding to an expected signal. In some cases, this angular error between, the constellation corresponding to the received signal and the constellation corresponding to the expected signal is caused by CFO (Carrier Frequency Offset) between a reference frequency of a local signal reference and the actual carrier frequency of the received signal. This CFO and/or phase noise (e.g., jitter) in the various clock references employed within the communication system may result in this angular error. When this angular error is left uncorrected, then significant errors may be made when demodulated and decoding a received signal. In addition, for higher order modulation types (e.g., those including more constellation points), an angular rotation can be catastrophic when making symbol mapping decisions of a received symbol sequence generated from the received signal.

As such, there exists a need in the art for an efficient and effective means by which compensation of this angular error between a constellation corresponding to a received signal and a constellation corresponding to an expected signal may be made.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 11A is a diagram illustrating an embodiment of a single-input-single-output (SISO) communication system.

FIG. 11B is a diagram illustrating an embodiment of a multiple-input-multiple-output (MIMO) communication system.

FIG. 11C is a diagram illustrating an embodiment of a multiple-input-single-output (MISO) communication system.

FIG. 11D is a diagram illustrating an embodiment of a single-input-multiple-output (SIMO) communication system.

DETAILED DESCRIPTION OF THE INVENTION

Figure 1:
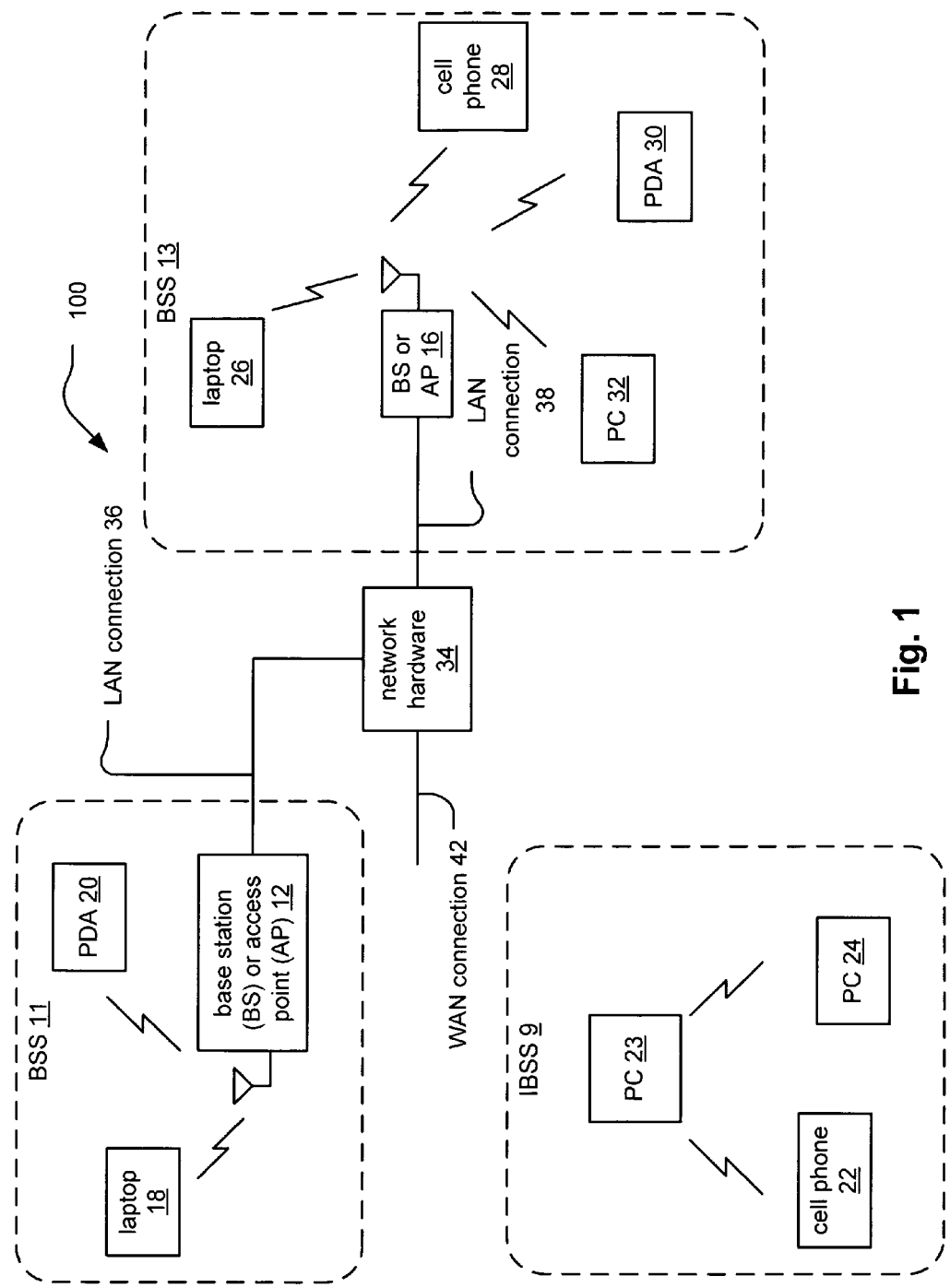
FIG. 1 is a diagram of a wireless communication system.

FIG. 1 is a diagram illustrating a communication system 100 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 100. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the communication system 100 or to communicate outside of the communication system 100, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the communication system 100 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 100.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
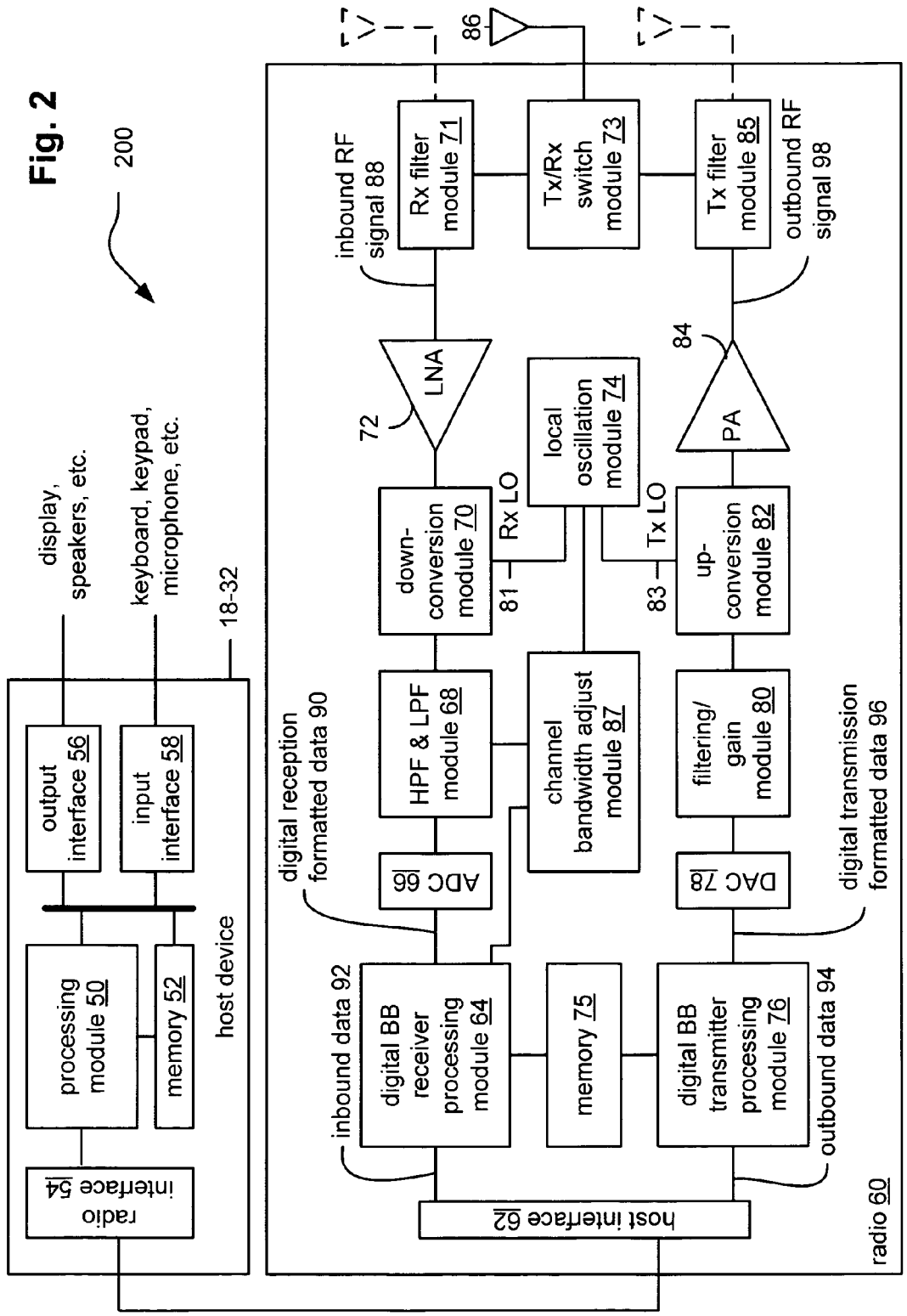
FIG. 2 is a diagram of a wireless communication device.

FIG. 2 is a diagram illustrating a wireless communication device 200 that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device 200 is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device 200.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/ gain module 68. The high pass and low pass filter module 68 filters, based on settings provided by the channel bandwidth adjust module 87, the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kHz to a few MHz. The digital receiver processing module 64, based on settings provided by the channel bandwidth adjust module 87, decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device 200 of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
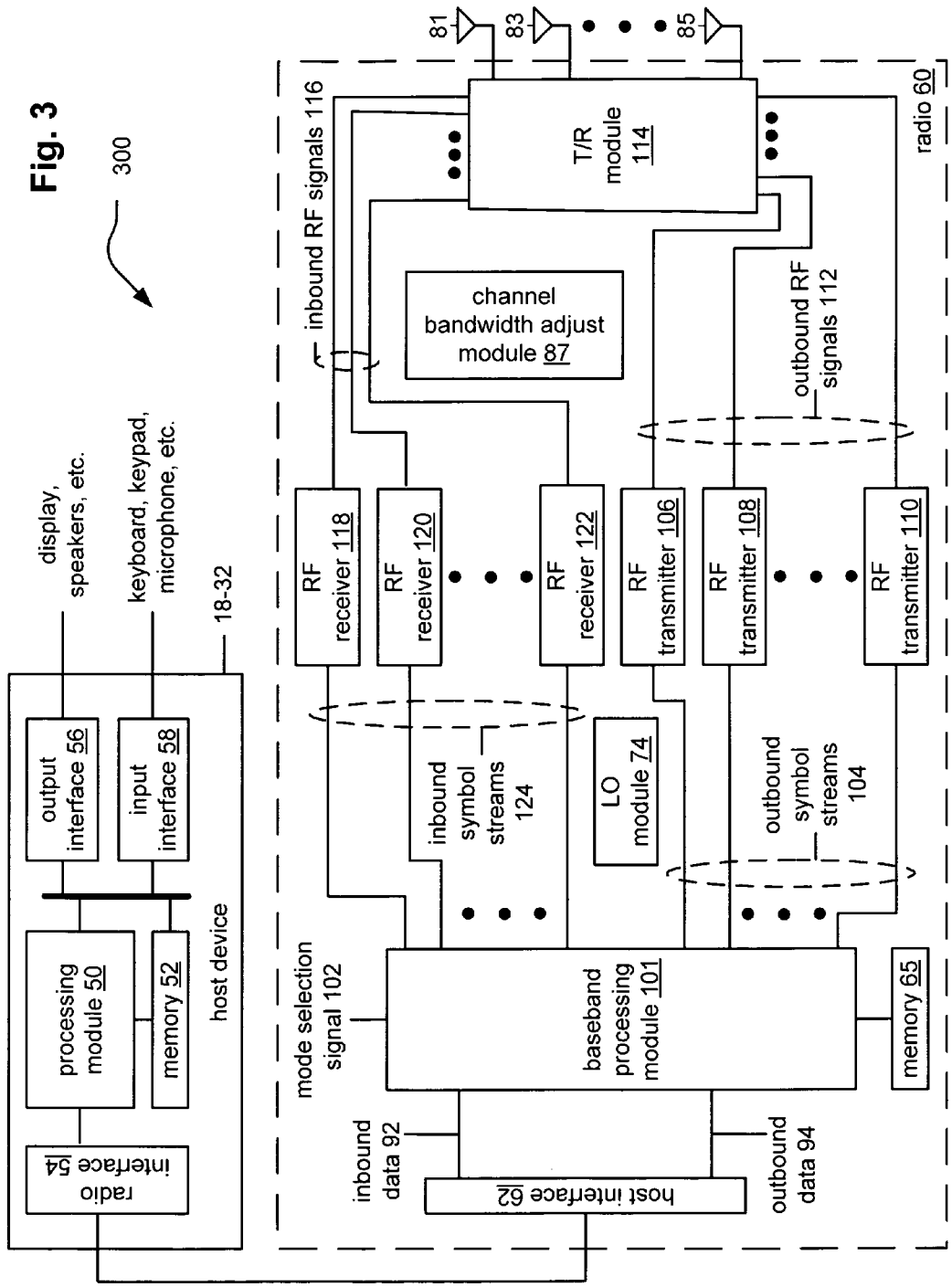
FIG. 3 is a diagram of another wireless communication device.

FIG. 3 is a diagram illustrating a wireless communication device 300 that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 101, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation de-mapping, decoding, de-interleaving, fast Fourier transform (FFT), cyclic prefix removal, space and time decoding, and/or descrambling. The digital transmitter functions include, but are not limited to, scrambling, encoding, interleaving, constellation mapping, modulation, inverse fast Fourier transform (IFFT), cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM (Orthogonal Frequency Division Multiplexing) symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device 300 of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
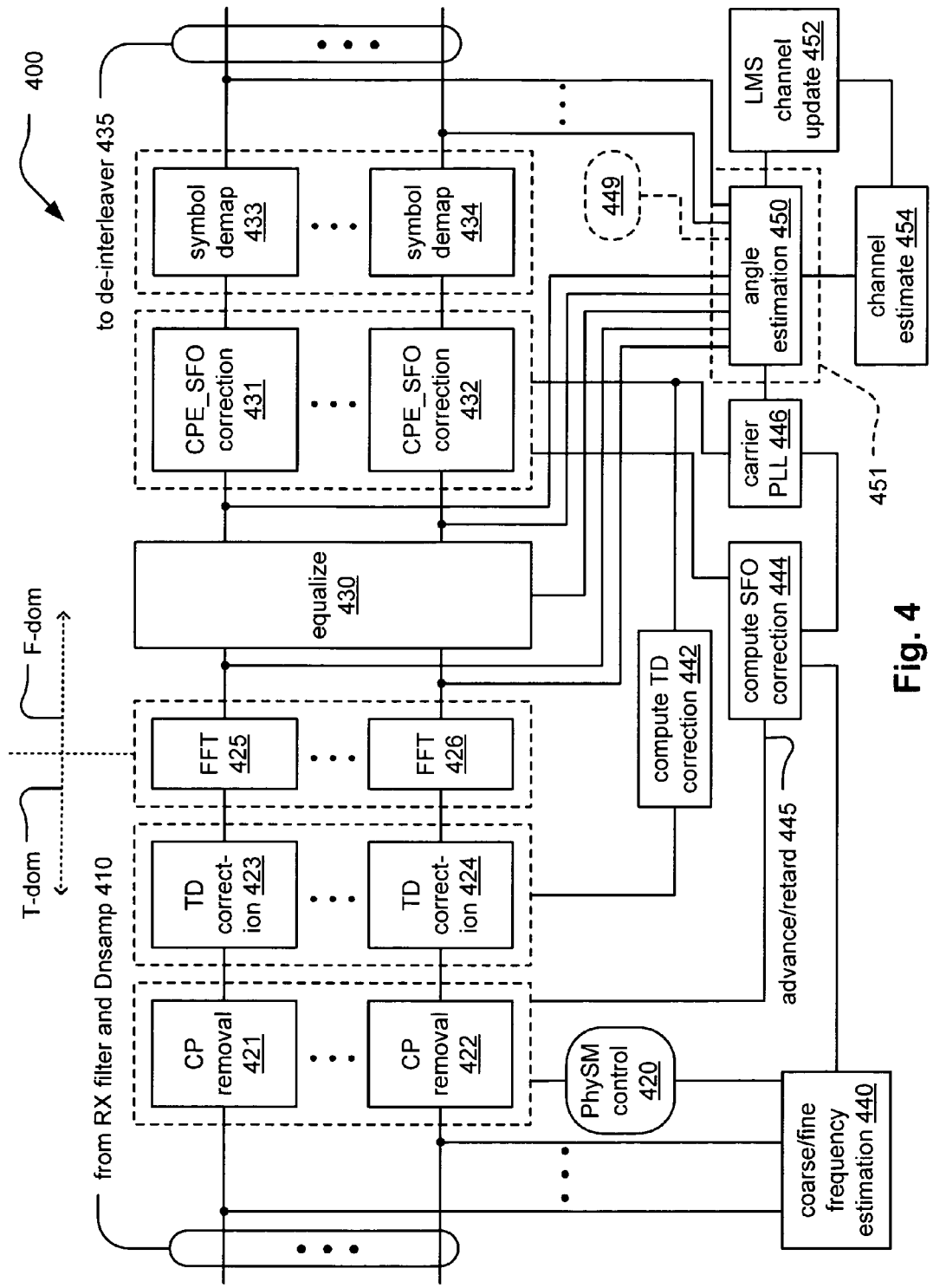
FIG. 4 is a diagram of feedback control within a communication device.

FIG. 4 is a diagram of feedback control 400 within a communication device. Initially, a plurality of signals, indicated by reference numeral 410, is received after undergoing receive filtering and down sampling. Such initial processing as receive filtering and down sampling may be viewed as being performed within an AFE (Analog Front End) of a communication device. In some embodiments, the feedback control 400 may be viewed as being performed in a baseband processing module as depicted in some other of the embodiments disclosed herein.

Within this feedback control 400, a coarse/fine frequency estimation module 440 is operable to initially perform coarse frequency estimation and then subsequently fine frequency estimation as governed by PHY (physical layer) control, as indicated by PhySM control input 420.

Also within this feedback control 400, cyclic prefix (CP) removal of this incoming signal streams may be performed as shown by the CP removal modules 421-422; the operation of these CP modules 421-422 is also governed by PHY control, as indicated by PhySM control input 420. The CP removal functionality is based on an advance/retard signal 445 provided from a compute SFO (Sampling Frequency Offset) correction module 444 that operates using inputs received from a carrier PLL (Phase Locked Loop) 446 and the coarse/fine frequency estimation module 440.

Thereafter, predictive time-domain (TD) PLL correction is computed using a plurality of TD correction modules 423-424 (based on signals received from the carrier PLL 446 that correspond to a previous plurality of received symbols (e.g., previous N-$1^{st}$ symbol in one embodiment)). These outputs from the TD correction modules 423-424 are then passed to a plurality of FFT (Fast Fourier Transform) modules 425-426. These FFT modules 425-426 operate to transform the signal processing from the time domain (T-dom) to the frequency domain (F-dom). An equalize module 430 is operable to perform equalization on the signals received from the FFT modules 425-426. The equalize module 430 may be viewed as performing a channel inversion operation on the signals received from the FFT modules 425-426 in an effort to compensate for, at least in part, the imperfections and deleterious characteristics of the communication channel over which a signal has been transmitted and from which the signal has been received. During a first instance, this equalize module 430 may be viewed as performing a $1^{st}$ pass of equalization, in that, the equalize processing may be viewed as being an iterative type process that compensates for any channel induced errors.

Each of a plurality of CPE_SFO correction modules 431-432 is operable to apply predictive SFO correction that has been computed using a previous plurality of symbols (e.g., previous n-$1^{st}$ symbol in one embodiment) while also considering common phase error (CPE) correction values. After undergoing equalization in the equalize module 430, these equalized signal streams are passed to the plurality of CPE_SFO correction modules 431-432. The CPE_SFO correction modules 431-432 receive input signals from both the compute SFO correction module 444 as well as the carrier PLL 446. In an initial pass through the receiver, the CPE correction value may be set to a phase of 0 (zero). The CPE correction value is updated upon any updated calculations of angle estimation using an angle estimation module 450 (more details of various embodiments of which are described below). The streams output from the CPE_SFO correction modules 431-432 are then provided to a plurality of symbol demap modules 433-434 that is operable to perform the appropriate symbol demapping of each of the symbols of these sequences of discrete values modulation symbols according to the appropriate modulation types (i.e., each modulation type includes a constellation shape and a corresponding mapping).

An angle estimation module 450 is operable to compute the CPE correction values. It is noted that the angle estimation module 450 within this embodiment as well as any other angle estimation module in any pother embodiment) can be implemented within a larger functional block, module, and/or device that is capable to perform additional operations. This concept is generally depicted using reference numeral 451 in this diagram.

These CPE correction values are then filtered by the carrier PLL 446 before being provided to the CPE_SFO correction modules 431-432. A compute TD correction module 442 then computes the TD PLL correction from the current symbol (e.g., the $n^{th}$ symbol) for use with respect to the next symbol (e.g., n+$1^{st}$ symbol). The compute SFO correction module 444 then computes the SFO correction from the current symbol (e.g., the nth symbol) for use with respect to the next symbol (e.g., n+$1^{st}$ symbol). The equalize module 430 is then also adjusted using the SFO correction values that have been calculated using the angle estimation module 450.

The same SFO correction values computed and applied for the predictive SFO correction employed above as applied in conjunction with the CPE correction values from the current symbol (e.g., the $n^{th}$ symbol). In this pass of the feedback control processing, the CPE correction has the current symbol phase estimate that has been calculated as described above. The plurality of symbol demap modules 433-434 is then operable to perform the appropriate symbol demapping of each of the symbols again. After this step, an LMS channel update module 452 is then operable to compute the LMS (Least Means Square) channel update error terms for use by the next symbol (e.g., $n+1^{st}$ symbol). The LMS channel update module 452 then is operable to provide updated channel information to a channel estimate module 454 for processing the next symbol (e.g., $n+1^{st}$ symbol).

The angle estimation module 450 is operable to compute the angular phase error, $\theta(est)$ or $\hat{\theta}$, between the outputs of the equalize module 430 and the expected constellation points of the expected modulation (having the expected constellation shape and corresponding mapping). This is employed by the carrier PLL 446 for CFO/SFO tracking by each of the corresponding appropriate modules.

The angle estimation module 450 is also operable to receive any additional terms (i.e., variables and/or coefficients) that can or may be required for arctangent processing as shown by reference numeral 449. These variables and/or coefficients can be provided via the signal, indicated by reference numeral 449, or from additional functional blocks as desired in a wide variety of embodiments.

It is noted that the angle estimation module 450 of FIG. 4 (or the angle estimation module of any other embodiment described herein) may be implemented as the baseband processing module 100 of the FIG. 3. Alternatively, the angle estimation module 450 may be implemented as the processing module 50 of either of the FIG. 2 or the FIG. 3. Generally speaking, any embodiment of angle estimation module described herein may be implemented as and generally referred to as a processing module with a memory communicatively coupled thereto to store operational instructions that enable the processing module to perform the angle estimation as described herein.

It is also noted that the feedback control 400 within a communication device may be viewed as being implemented within a communication system operating using OFDM (Orthogonal Frequency Division Multiplexing) signaling. Several of the following embodiments are directed towards estimating an angle between a constellation that corresponds to an OFDM symbol of a signal received from a communication channel and an expected constellation. In doing so, the processing operates on data tones and pilot tones of each of the OFDM symbols.

Figure 5:
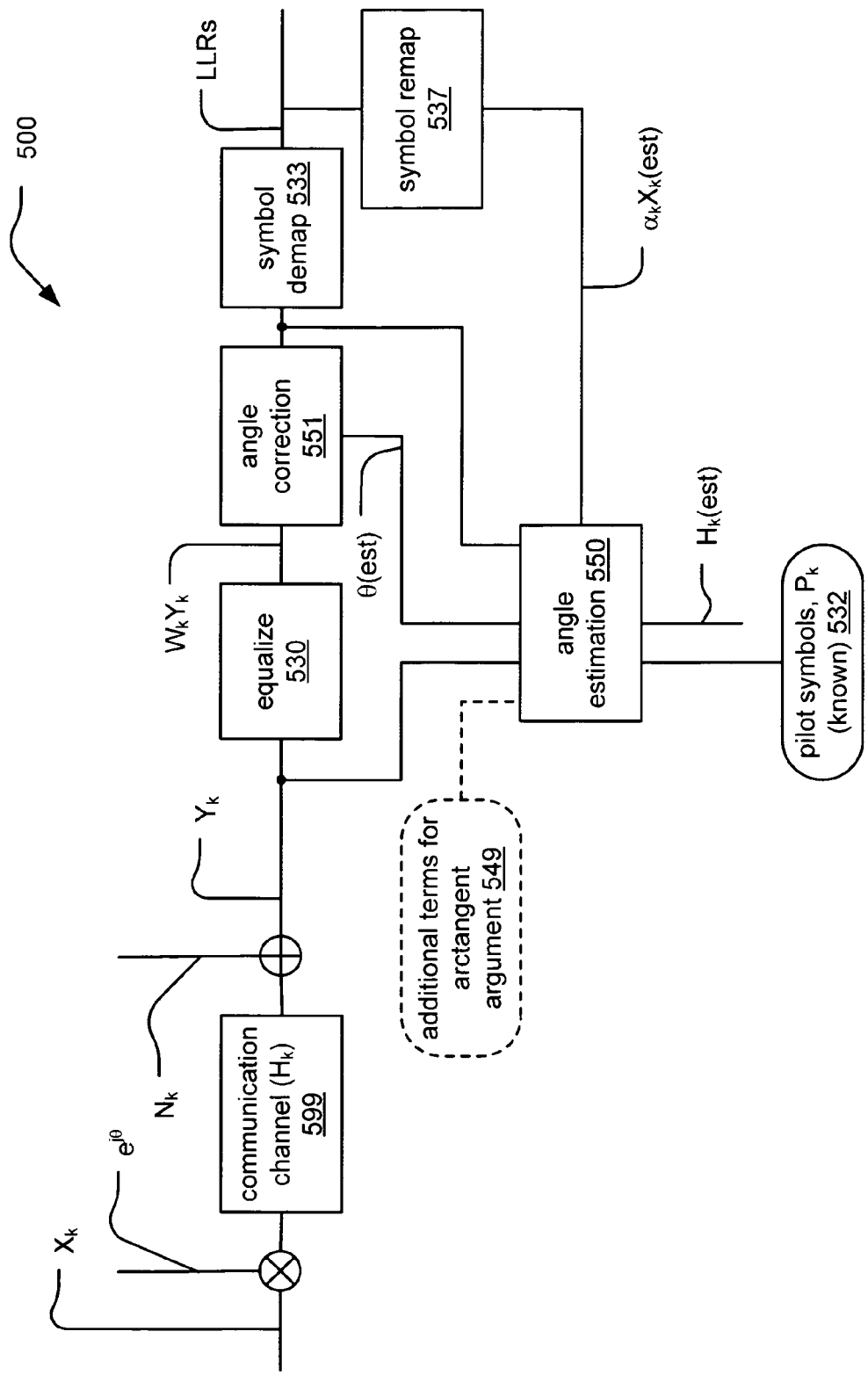
FIG. 5 and FIG. 6 are diagrams illustrating various embodiments of a communication device including an angle estimation module.
Figure 6:
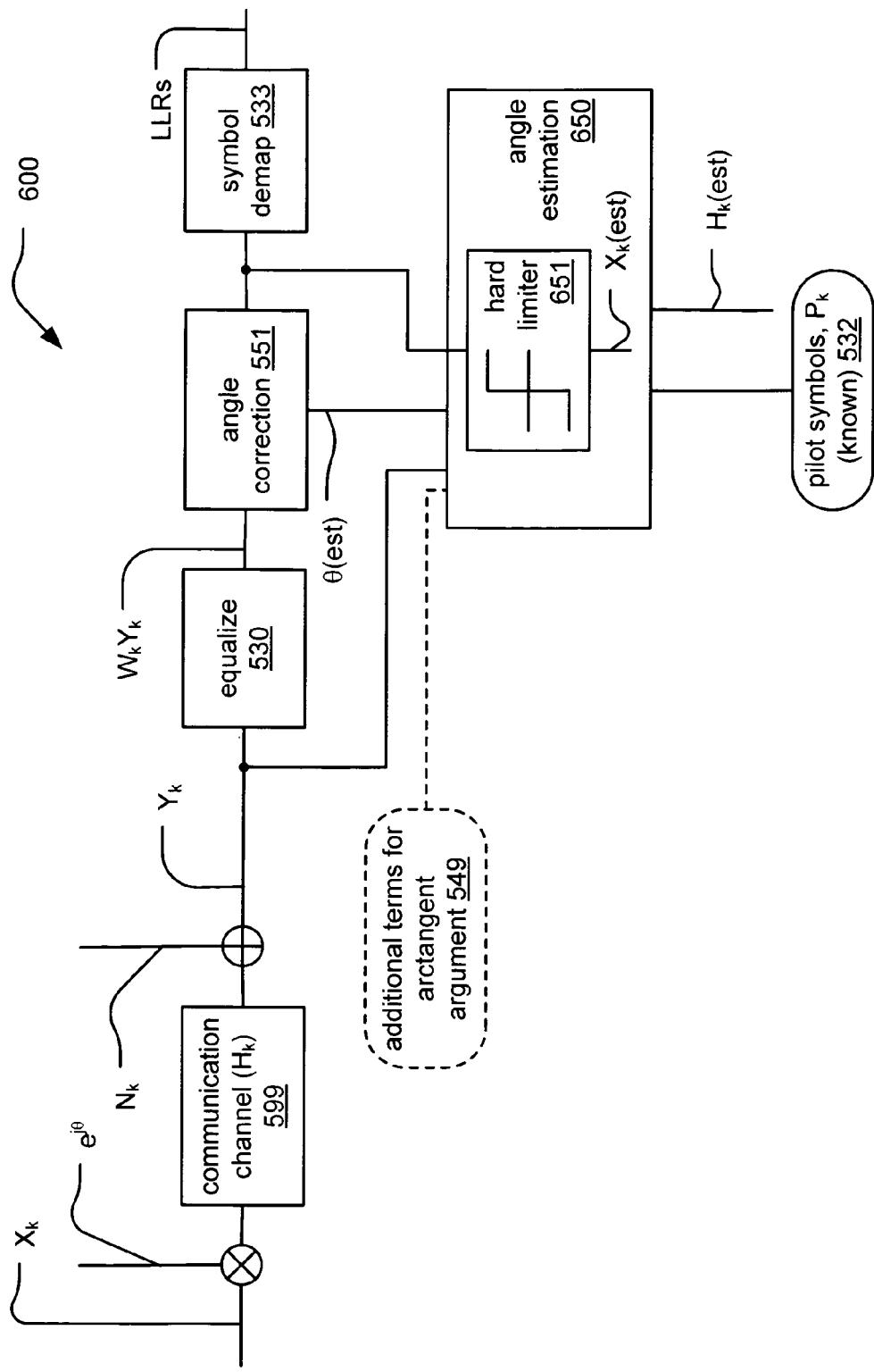

FIG. 5 and FIG. 6 are diagrams illustrating various embodiments of a communication device including an angle estimation module.

Referring to FIG. 5, which shows an implementation of an angle estimation module 550 within a communication device 500, the signal that is processed is modeled as follows:

$$Y_k = H_k X_k e^{j\theta} + N_k$$

It is noted that this formula above can be applied to a single-input-single-output (SISO) communication system (e.g. such as the SISO communication system 1101 of the FIG. 11A) or within a communication system having multiple streams in which the phase error for each of the streams is approximately the same (or assumed to be approximately the same).

It is also noted that the various embodiments of performing angle estimation as presented herein can be applied to a wide variety of embodiments and generally applied to any modulation scheme. In some of the exemplary embodiments described below, OFDM is employed, but it again noted that these approaches can be generally applied to any modulation scheme.

Each of the following is provided as function of the individual tone, denoted by subscript "k", for an OFDM symbol, where:

$X_k$ is the transmitted signal;

$H_k$ is the transfer function of the communication channel 599;

$e^{j\theta}$ is the incurred phase shift or angular rotation corresponding to $\theta$;

$N_k$ is the additive noise incurred by the signal as it travels through the communication channel (it is assumed that var $(N_k)=\sigma^2$, $\forall k$); and $Y_k$ is the received signal.

The received signal, $Y_k$, is passed to an equalize module 530 that outputs an equalized signal, $W_k Y_k$. This equalized signal, $W_k Y_k$, is simultaneously passed to a symbol demap module 533 that is operable to perform symbol demapping of the symbol sequence according to an appropriate modulation (i.e., a constellation and a corresponding mapping of the constellation points included therein). The output of the symbol demap module 533 may be viewed as being soft bit information (e.g., LLR (Log-Likelihood Ratio) in some embodiments). This soft bit information is then fed back to a remapper module 537 that is operable to perform symbol remapping of the soft bit information according to an appropriate modulation (i.e., a constellation and a corresponding mapping of the constellation points included therein) to generate a corresponding symbol estimate that is shown as, $\alpha_k X_k$ (est), where $\alpha_k$ may be viewed as being a scale factor corresponding to that particular tone, k. In some embodiments, any one of the more of the scale factors, $\alpha_k X_k$ for any k, can be 1.0 (one) in which case the corresponding symbol estimate output from the remapper module 537 would be merely $X_k$(est). This symbol estimate, $\alpha_k X_k$(est), is then passed to an angle estimation module 550 that is operable to perform the angle estimation of $\theta$ (whose estimate may be referred to as $\theta$(est) or $\hat{\theta}$); this angle estimation of $\theta$ (i.e., $\theta$(est)) is then passed back to an angle correction module 551 that is operable actually to perform any angular correction for received signals from the equalize module 530 based on the angle estimation of $\theta$ (i.e., $\theta$(est)). The angle estimation module 550 also receives an estimate of the communication channel, $H_k$(est) or $H_k$. Also, to perform the appropriate calculations of angle estimation, the angle estimation module 550 also receives a plurality of pilot symbol, $P_k$, that are predetermined (i.e., known), as shown by reference numeral 532.

As similarly mentioned above with respect to another embodiment, an angle estimation module is also operable to receive any additional terms (i.e., variables and/or coefficients) that can or may be required for arctangent processing as shown by reference numeral 549. These variables and/or coefficients can be provided via the signal, indicated by reference numeral 549, or from additional functional blocks as desired in a wide variety of embodiments.

As mentioned above within another embodiment depicting one possible embodiment of an angle estimation module, the angle estimation module 540 may be operable to perform a variety of different functions including the estimation of the angular phase error, θ(est) or θ̂, between the outputs of the equalize module 530 and the expected constellation points of the expected modulation (having the expected constellation shape and corresponding mapping);

Referring to FIG. 6, which shows an implementation of an angle estimation module 650 within a communication device 600, the signal that is processed is modeled similarly as with respect to FIG. 5, namely, $Y_k = H_k X_k e^{j\theta} + N_k$.

The difference between this embodiment of FIG. 6 when compared to the embodiment of FIG. 5, the equalized signal, $W_k Y_k$, output from the equalize module 530 is passed directly to the angle estimation module 650. The equalized signal, $W_k Y_k$, includes a hard limiter 651 that is operable to make an estimate of the received data, $X_k(\text{est})$ or $X_k$. This is in contradistinction to the previous embodiment where the symbol estimate, $\alpha_k X_k(\text{est})$, is regenerated (i.e. remapped) from the already demapped symbol.

Figure 7:
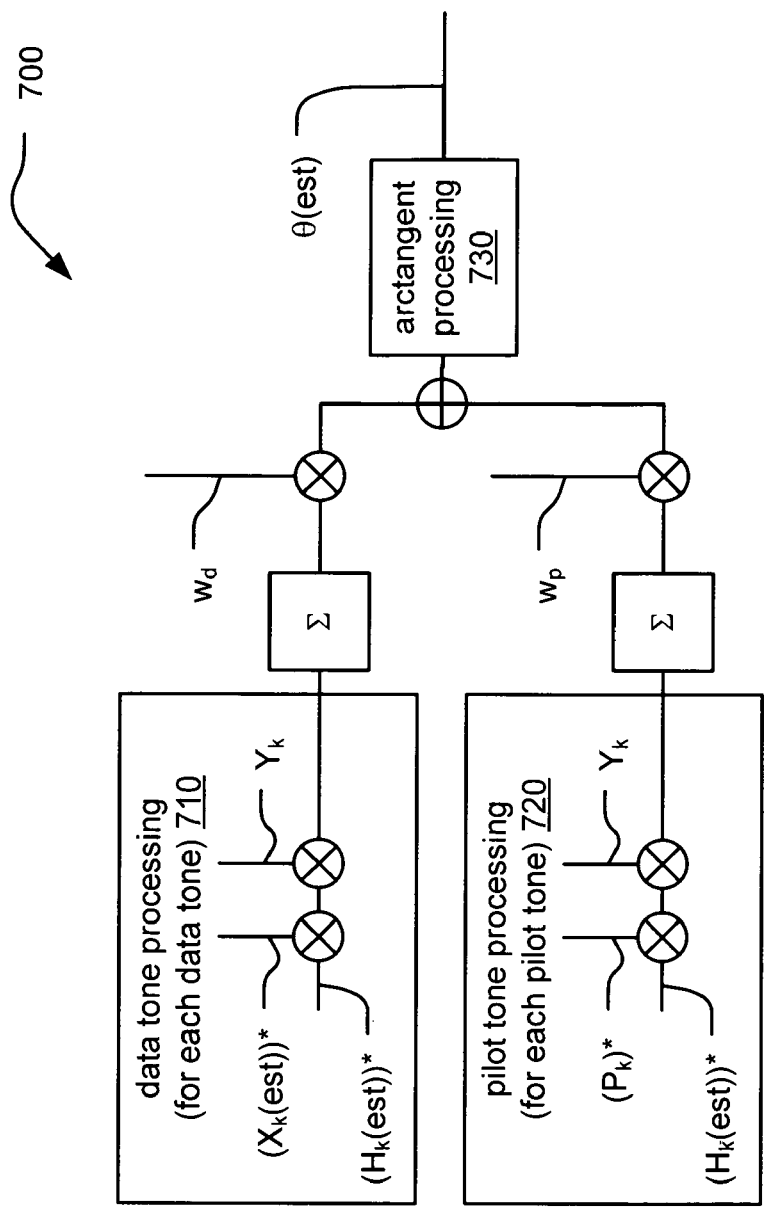
FIG. 7, FIG. 8, and FIG. 9 are diagrams illustrating various embodiments of angular estimation functionality.
Figure 8:
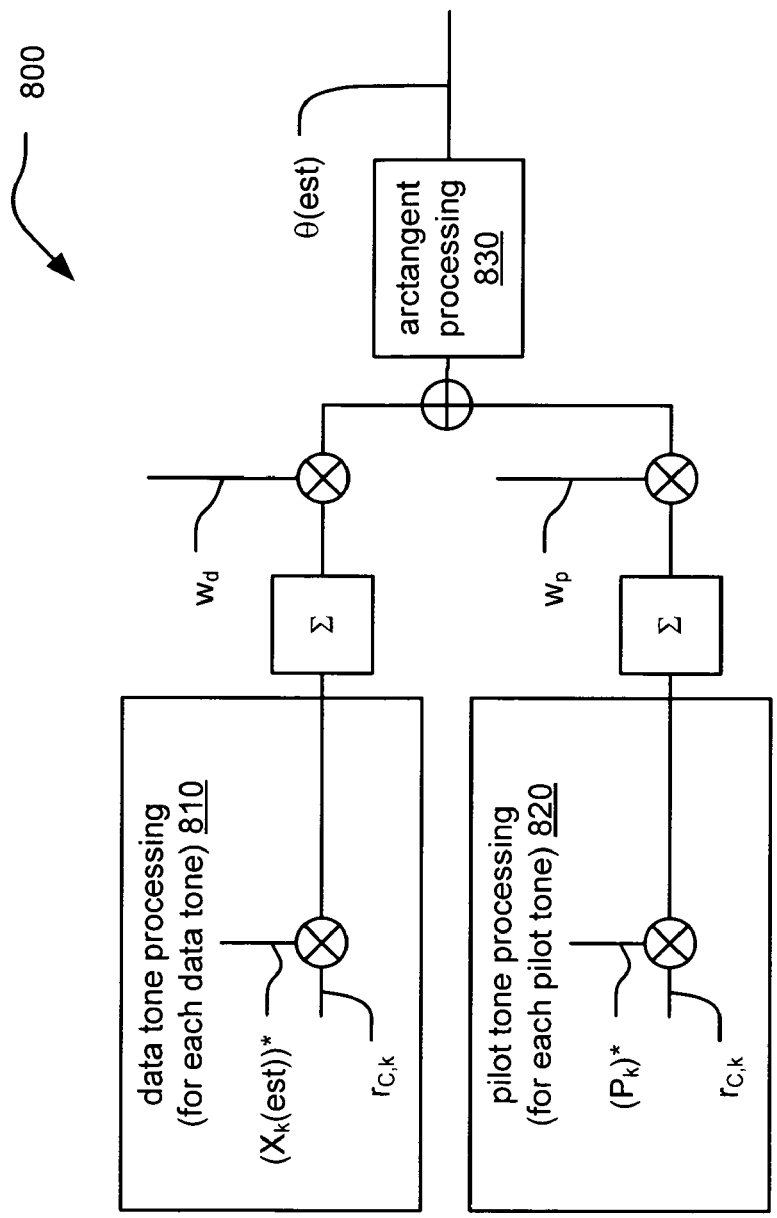
Figure 9:
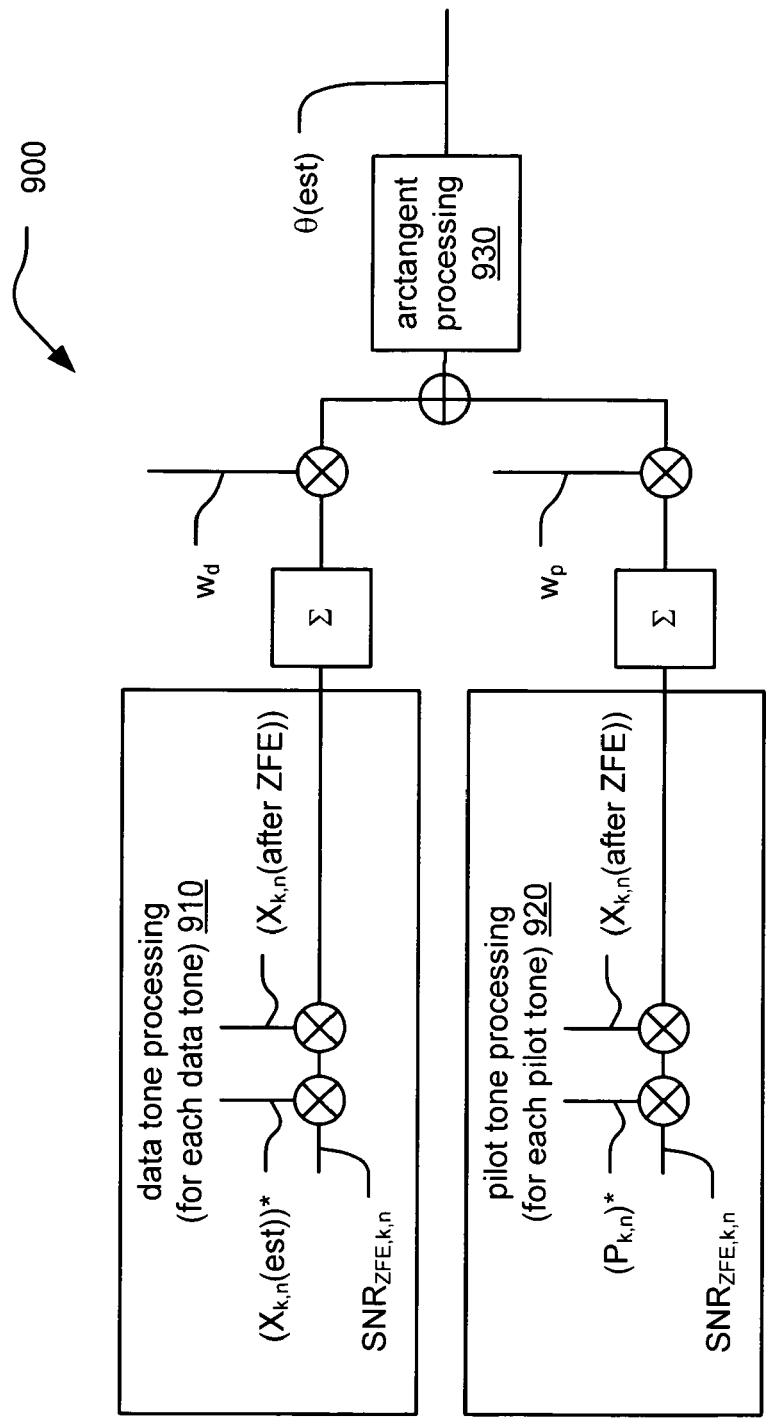

FIG. 7, FIG. 8, and FIG. 9 are diagrams illustrating various embodiments of angular estimation functionality.

Referring to FIG. 7, the angle estimation, θ(est) or θ̂, is shown pictorially with respect to reference numeral 700. Mathematically, the processing as shown within the FIG. 7 may be depicted as follows:

$$\hat{\theta} = \arctan\left[w_d \sum_{k \in S_d} \hat{H}_k^* \hat{X}_k^* Y_k + w_p \sum_{k \in S_p} \hat{H}_k^* P_k^* Y_k\right], \text{ where:}$$

$\hat{H}_k$: channel estimate;
$X_k$: data estimate;
$P_k$: pilot symbol;
$S_d$: Set of all data tones;
$S_p$: Set of all pilot tones;
$w_d$=0 or 1; and
$w_p$=0 or 1

It is noted here that the weights, $w_d$ and $w_p$, may alternatively be set to any value as desired in a particular embodiment. In one possible embodiment as indicated above, the setting of the weights, $w_d$ and $w_p$, is to allow each of them to be either 0 or 1, but generally speaking, they may be adjusted to any desired value.

It is noted here that the superscript "*" of the variable A identifies the "conjugate" of the variable A; for example "A*" indicates the "conjugate of A."

This angle estimation module 700 may be viewed as being performed using data tone processing (for each data tone) as shown by reference numeral 710 and using pilot tone processing (for each pilot tone) as shown by reference numeral 720. Once each of a data tone product term and a pilot tone product term have been generated using the data tone processing 710 and the pilot tone processing 720, respectively, these values are appropriately weighted and summed together thereby generating an argument term. The arctangent of the argument term is then determined (using arctangent processing 730) thereby generating the estimate of the angle, θ(est) or θ̂.

For each data tone of a plurality of data tones of the OFDM symbol, this approach involves multiplying a conjugate of a corresponding channel estimate, a conjugate of a corresponding data estimate, and a corresponding received signal component thereby generating a corresponding data tone product term. For each pilot tone of a plurality of pilot tones of the OFDM symbol, this approach involves multiplying a conjugate of a corresponding channel estimate, a conjugate of a corresponding pilot symbol, and a corresponding received signal component thereby generating a corresponding pilot tone product term.

After the data tone product term and the pilot tone product term are determined, the approach involves summing each data tone product term thereby generating a first summed term and multiplying the first summed term by a first weighting term thereby generating a first weighted, summed term. The approach also involves summing each pilot tone product term thereby generating a second summed term and multiplying the second summed term by a second weighting term thereby generating a second weighted, summed term. The approach then involves adding the first weighted, summed term and the second weighted, summed term thereby generating an argument term, and ultimately determining an arctangent of the argument term thereby generating the estimate of the angle.

Referring to FIG. 8, another embodiment of angle estimation, θ(est) or θ̂, is shown pictorially with respect to reference numeral 800. This embodiment operates according to a maximal ratio combining (MRC) approach for multiple received signals within a communication device. The communication channel may be modeled as follows:

$$Rx1 \leftarrow \begin{bmatrix} r_1 \\ r_2 \end{bmatrix} = \begin{bmatrix} h_1 \\ h_2 \end{bmatrix} X + \begin{bmatrix} n_1 \\ n_2 \end{bmatrix}, \text{ where:}$$

$\text{var}(n_1) = \sigma_{n_1}^2$, and $\text{var}(n_2) = \sigma_{n_2}^2$.

Using an MRC approach, a "combined" received signal, $r_C$, may be generated.

The modeling of such a system may be performed as follows. For every tone k, MRC combining gives the following:

$$\underbrace{\begin{bmatrix} \frac{h_1^*}{\sigma_{n_1}} & \frac{h_2^*}{\sigma_{n_2}} \end{bmatrix} \begin{bmatrix} \frac{r_1}{\sigma_{n_1}} \\ \frac{r_2}{\sigma_{n_2}} \end{bmatrix}}_{r_C} = \underbrace{\left(\frac{|h_1|^2}{\sigma_{n_1}^2} + \frac{|h_2|^2}{\sigma_{n_2}^2}\right)}_{h_C} X e^{j\theta} + \underbrace{\left(\frac{h_1^* n_1}{\sigma_{n_1}^2} + \frac{h_2^* n_2}{\sigma_{n_2}^2}\right)}_{n_C}$$

$$r_C = h_C X e^{j\theta} + n_C$$

and $\text{var}(n_C) = \sigma_{n_C}^2 = \frac{|h_1|^2}{\sigma_{n_1}^2} + \frac{|h_2|^2}{\sigma_{n_2}^2}$.

It is noted again here that the subscript C denotes "combined."

Since the combined noise power could be different for each tone, it's necessary to perform whitening on the combined received signal of each tone. This can be carried out by dividing $r_C$ by $\sigma_{n_C}$ to generate an effective received signal component (e.g., an effective received symbol), as $r_E = r_C / \sigma_{n_C}$. Also, the $h_C$ is divided by $\sigma_{n_C}$ to generate an effective channel estimate as $h_E = h_C / \sigma_{n_C}$. Again, the subscript C denotes "combined", and the subscript E denotes "effective."

For every tone, multiplying the effective received symbol with the conjugate of the effective channel estimate and the conjugate of the data estimate, the angle estimation of the FIG. 8 is provided as follows:

$$\hat{\theta} = \arctan\left[w_d \sum_{k \in S_d} \frac{r_{C,k}}{\sigma_{n_{C,k}}}\left(\frac{\hat{h}_{C,k}}{\sigma_{n_{C,k}}} \hat{X}_k\right)^* + w_p \sum_{k \in S_p} \frac{r_{C,k}}{\sigma_{n_{C,k}}}\left(\frac{\hat{h}_{C,k}}{\sigma_{n_{C,k}}} P_k\right)^*\right] \quad (a1)$$

-continued $$\hat{\theta} = \arctan\left[w_d \sum_{k \in S_d} r_{C,k} \hat{X}_k^* \frac{\hat{h}_{C,k}^*}{\sigma_{n_{C,k}}^2} + w_p \sum_{k \in S_p} r_{C,k} P_k^* \frac{\hat{h}_{C,k}^*}{\sigma_{n_{C,k}}^2}\right] \quad (a2)$$

$$\hat{\theta} = \arctan\left[w_d \sum_{k \in S_d} r_{C,k} \hat{X}_k^* + w_p \sum_{k \in S_p} r_{C,k} P_k^*\right] \quad (b)$$

where:
$r_C,k$: combined received data;
$\hat{X}_k$: data estimate;
$P_k$: pilot symbol;
$S_d$: Set of all data tones;
$S_p$: Set of all pilot tones; and
$w_d$=0 or 1; and
$w_p$=0 or 1

In some embodiments that provide a highly accurate channel estimate, the above equivalent equations (a1) and (a2), the angle estimation, $\hat{\theta}$, can be calculated using only following terms as shown in equation (b): the combined received data, $r_{C,k}$, the conjugate of the data estimate, $\hat{X}_k^*$, and the conjugate of the pilot symbol, $P_k^*$. The implementation of equation (b) is shown in an embodiment of FIG. 8.

As also mentioned with respect to another embodiment above, it is noted here that the weights, wt and $w_p$, may alternatively be set to any value as desired in a particular embodiment. In one possible embodiment as indicated above, the setting of the weights, $w_d$, and $w_p$, is to allow each of them to be either 0 or 1, but generally speaking, they may be adjusted to any desired value.

It is again noted that $\hat{X}_k$ may be either determined directly using a hard limiter within an angle estimation module or by remapping an already demapped symbol.

Similar to the embodiment described above, this angle estimation 800 may be viewed as being performed using data tone processing (for each data tone) as shown by reference numeral 810 and using pilot tone processing (for each pilot tone) as shown by reference numeral 820. Once each of a data tone product term and a pilot tone product term have been generated using the data tone processing 810 and the pilot tone processing 820, respectively, these values are appropriately weighted and summed together thereby generating an argument term. The arctangent of the argument term is then determined (using arctangent processing 830) thereby generating the estimate of the angle, θ(est) or $\hat{\theta}$.

For each data tone of a plurality of data tones of the OFDM symbol, this approach involves multiplying a corresponding effective received signal component (e.g., an effective received symbol), a conjugate of a corresponding effective channel estimate, and a conjugate of a corresponding data estimate thereby generating a corresponding data tone product term. For each pilot tone of a plurality of pilot tones of the OFDM symbol, this approach involves multiplying a corresponding effective received signal component (e.g., an effective received symbol), a conjugate of a corresponding effective channel estimate, and a conjugate of a corresponding pilot symbol thereby generating a corresponding pilot tone product term.

When whitening is employed, the effective channel estimate can be a whitened channel estimate, the effective received signal component can be a whitened received signal component.

After the data tone product term and the pilot tone product term are determined, the approach involves summing each data tone product term thereby generating a first summed term and multiplying the first summed term by a first weighting term thereby generating a first weighted, summed term. The approach also involves summing each pilot tone product term thereby generating a second summed term and multiplying the second summed term by a second weighting term thereby generating a second weighted, summed term. The approach then involves adding the first weighted, summed term and the second weighted, summed term thereby generating an argument term, and ultimately determining an arctangent of the argument term thereby generating the estimate of the angle.

Referring to FIG. 9, another embodiment of angle estimation, θ(est) or θ, is shown pictorially with respect to reference numeral 900. This embodiment may be viewed as being applicable to angle estimation within a 2×2 MIMO communication system (or even adapted to service higher order MIMO communication systems). These principles are presented with respect to a 2×2 MIMO communication system, but may be extended to higher order MIMO communication systems as well. The 2×2 MIMO communication system is employed for illustration and clarity for the reader.

In this depiction of a 2×2 MIMO communication system, it is assumed that the phase noise is correlated in each of the antenna paths of a communication receiver device.

Generally speaking, this approach involves treating each of the transmission streams within the 2×2 MIMO communication system separately. In such an approach, the model for the 2×2 MIMO communication system may be represented mathematically as follows:

$$Y_k = H_k \begin{bmatrix} e^{j\theta_1} & 0 \\ 0 & e^{j\theta_2} \end{bmatrix} X_k + N_k, \text{ where:}$$

$X_k$ is the transmitted signal;
$H_k$ is the transfer function of the communication channel; the matrix, $$\begin{bmatrix} e^{j\theta_1} & 0 \\ 0 & e^{j\theta_2} \end{bmatrix},$$

represents the angular rotations incurred, namely, $\theta_1$ and $\theta_2$;
$N_k$ is the additive noise incurred by the signal as it travels through the communication channel (it is assumed that var$(N_k)=\sigma^2 I, \forall k$) (added I where I is an identity matrix); and
$Y_k$ is the received signal.

An equalizer, such as the simple zero forcing equalizer (ZFE), is implemented to process the signal received from the communication channel, and the signal after the ZFE may be represented as follows:

$$\tilde{X}_k = H_k^{-1} Y_k = \begin{bmatrix} e^{j\theta_1} & 0 \\ 0 & e^{j\theta_2} \end{bmatrix} X_k + \underbrace{H_k^{-1} N_k}_{N_{ZFE,k}}$$

The final term, $H_k^{-1} N_k$, may also be viewed as the noise at the output of the ZFE. Its variance is denoted by $\sigma_{ZFE,k}^2$.

After undergoing whitening, the signal may be represented as follows:

$$\frac{\tilde{X}_{k,n}}{\sigma_{ZFE,k,n}} = \frac{X_{k,n}}{\sigma_{ZFE,k,n}} e^{j\theta_n} + \tilde{N}_{k,n}, n = 1, 2, \text{var}(\tilde{N}_{k,n}) = 1.$$

In the above equation, for each tone k, it is noted that the left hand side of the equation, $$\frac{\tilde{X}_{k,n}}{\sigma_{ZFE,k,n}},$$

can be viewed as being a corresponding effective received signal component (e.g., an effective received symbol), and the term, $$\frac{1}{\sigma_{ZFE,k,n}},$$

can be viewed as being an effective channel estimate. To form the argument used for arctangent processing, again, the effective received symbol is multiplied with the conjugate of the effective channel estimate and the conjugate of the data estimate. It is noted that n varies and denotes a transmit chain. In a 2×2 MIMO communication system, n varies between 1 and 2. In an m×m MIMO communication system, n would vary between 1, 2, and . . . m.

Based on this 2×2 MIMO communication system, the angle estimation for the n-th path as performed according to the FIG. 9 is provided as follows:

$$\hat{\theta}_n = \arctan\left[ w_d \sum_{k \in S_d} \tilde{X}_{k,n} \hat{X}_{k,n}^* \frac{1}{\frac{\sigma_{ZFE,k,n}^2}{SNR_{ZFE,k,n}}} + w_p \sum_{k \in S_p} \tilde{X}_{k,n} P_{k,n}^* \frac{1}{\frac{\sigma_{ZFE,k,n}^2}{SNR_{ZFE,k,n}}} \right].$$

This term, $1/\sigma_{ZFE,k,n}^2 = SNR_{ZFE,k,n}$, may also be viewed as being an SNR (Signal to Noise Ratio) weighting term. This per-tone SNR is a function of the channel, $H_k$, and the noise, $N_k$.

In similar fashion to the way that angular rotation may be represented using a matrix notation, the communication channel transfer function, $H_k$, may also be represented in matrix format.

$$H_k = \begin{bmatrix} H_{11,k} & H_{12,k} \\ H_{21,k} & H_{22,k} \end{bmatrix}$$

The inverse of the communication channel transfer function, $H_k$, is then represented as follows:

$$H_k^{-1} = \frac{1}{\det(H_k)} \begin{bmatrix} H_{22,k} & -H_{12,k} \\ -H_{21,k} & H_{11,k} \end{bmatrix}$$

-continued $$= \frac{1}{|\det(H_k)|} \begin{bmatrix} H_{22,k} & -H_{12,k} \\ -H_{21,k} & H_{11,k} \end{bmatrix} e^{-j\angle \det(H_k)}$$

For each of the streams (e.g., n=1 and n=2), the corresponding SNR weighting terms may be represented as a function of the communication channel transfer function, $H_k$, and more specifically as a function of the individual elements of the matrix representation of the communication channel transfer function, $H_k$':

$$\frac{1}{\sigma_{ZFE,k,1}^2} = \frac{|\det(H_k)|^2}{|H_{22,k}|^2 \sigma_{N_k,1}^2 + |H_{12,k}|^2 \sigma_{N_k,2}^2}, \text{ and}$$

$$\frac{1}{\sigma_{ZFE,k,2}^2} = \frac{|\det(H_k)|^2}{|H_{21,k}|^2 \sigma_{N_k,1}^2 + |H_{11,k}|^2 \sigma_{N_k,2}^2}.$$

In the following expression, $W_k = H_k^{-1}$ (i.e., the equalizer transfer function does a channel inversion). Based on this, the following expressions denote the angle estimate for each of the 2 streams within one possible embodiment of angle estimation.

$$\hat{\theta}_1 = \arctan\left[ w_d \sum_{k \in S_d} (W_k Y_k) \hat{X}_k^* \frac{|\det(H_k)|^2}{|H_{22,k}|^2 \sigma_{N_k,1}^2 + |H_{12,k}|^2 \sigma_{N_k,2}^2} + w_p \sum_{k \in S_p} (W_k Y_k) P_k \frac{|\det(H_k)|^2}{|H_{22,k}|^2 \sigma_{N_k,1}^2 + |H_{12,k}|^2 \sigma_{N_k,2}^2} \right], \text{ and}$$

$$\hat{\theta}_2 = \arctan\left[ w_d \sum_{k \in S_d} (W_k Y_k) \hat{X}_k^* \frac{|\det(H_k)|^2}{|H_{21,k}|^2 \sigma_{N_k,1}^2 + |H_{11,k}|^2 \sigma_{N_k,2}^2} + w_p \sum_{k \in S_p} (W_k Y_k) P_k \frac{|\det(H_k)|^2}{|H_{21,k}|^2 \sigma_{N_k,1}^2 + |H_{11,k}|^2 \sigma_{N_k,2}^2} \right]$$

The term, $W_k Y_k$, may be viewed as being the signal provided from an equalize module as depicted within many of the other embodiments above. The term, $\hat{X}_k$, is the regenerated/remapped symbol estimate created from the LLRs that have been generated by the symbol demap module as depicted within many of the other embodiments above. The remaining terms, provided in the log domain, namely, $\log_2(|\det(H_k)|)$ $\log_2(|H_{22,k}|^2 \sigma_{N_{k,1}}^2 + |H_{12,k}|^2 \sigma_{N_{k,2}}^2)$, $\log_2(|H_{21,k}|^2 \sigma_{N_{k,1}}^2 + |H_{11,k}|^2 \sigma_{N_{k,2}}^2)$, may be provided as the coefficients provided from another module, functional block, and/or device as generally depicted above within other embodiments (e.g., using the reference numeral 549 in FIG. 5 and FIG. 6). In addition to a reduction in the dynamic range that needs to be covered, the implementation and use of various parameters in the log domain can allow for significant reduction in complexity of hardware. For example, implementing various calculations within the log logarithmic domain enables multiplication operations to be performed using addition, and division operations to be performed using subtraction.

Figure 10:
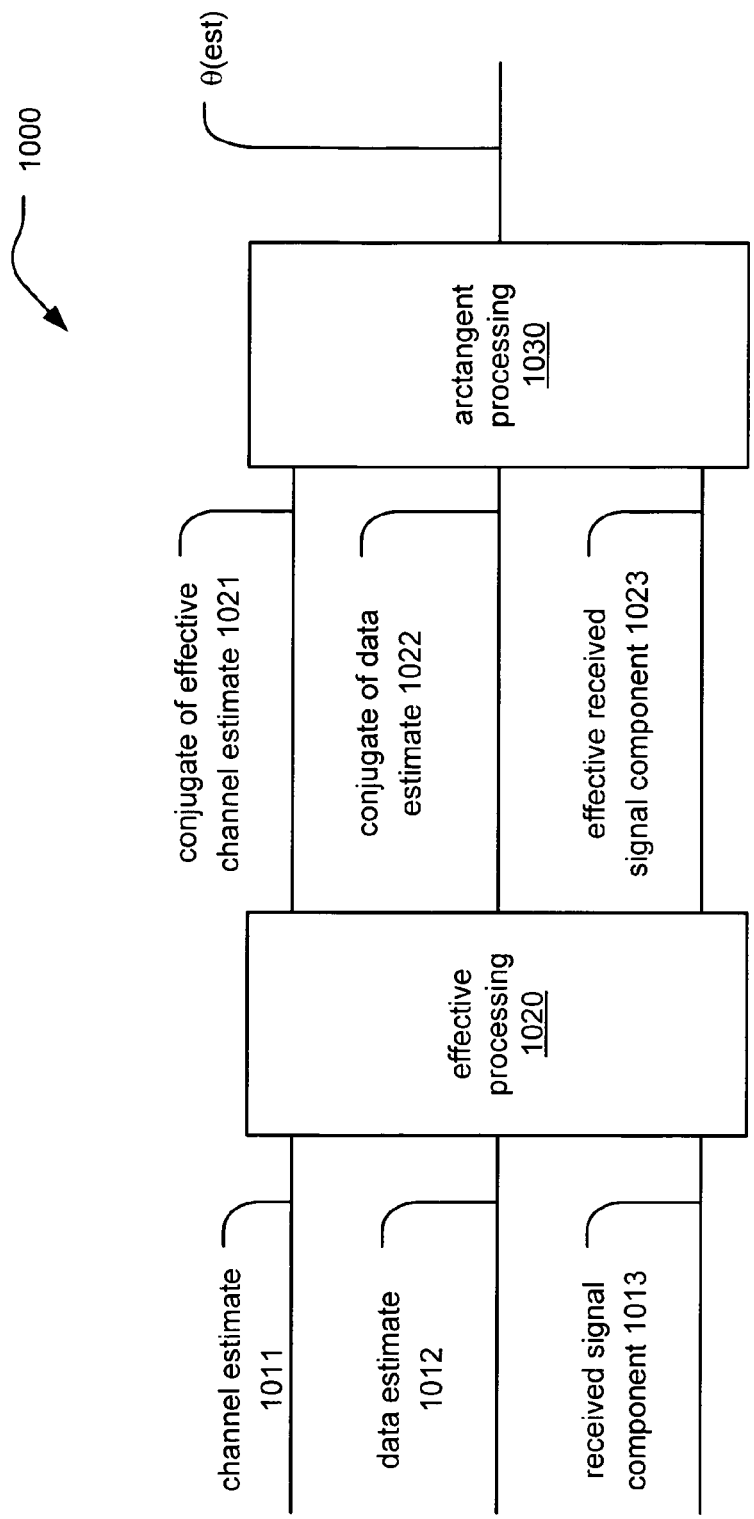
FIG. 10 is a diagram illustrating another embodiment of angular estimation functionality.

FIG. 10 is a diagram illustrating another embodiment of angular estimation functionality is shown pictorially with respect to reference numeral 1000. The generalized implementation 1000 can be adapted to any of a variety of communication system types. Three different inputs (a channel estimate 1011, a data estimate 1012, and a received signal component 1013) are provided to an effective processing module 1020. The effective processing module 1020 generates three outputs (a conjugate of an effective channel estimate 1021, a conjugate of a data estimate 1022, and an effective received signal component 1023).

It is noted that it any of the inputs to the effective processing module 1020 is a scalar (e.g., the channel estimate 1011 is a scalar in some embodiments), then the "conjugate" of that term would simply be that term. Each of these three terms output from the effective processing module 1020 is provided to an arctangent processing module 1030. It is also noted that, in some embodiments, effective processing module 1020 can simply be a pass-through type of module. For example, the conjugate of the effective channel estimate 1021 can simply be one (e.g., 1.0) in some instances. In such an embodiment, the conjugate of the effective channel estimate 1021 would not really be employed by the arctangent processing module 1030. Also, in some embodiments, the conjugate of the effective channel estimate 1021 can be an actual channel estimate corresponding to a communication channel from which a signal is received and processed to undergo angle estimation. Analogously, in some embodiments, the effective received signal component can be an actual received signal component that has been received from such the communication channel.

Therefore, this embodiment 1000 may be generalized and applied to any of the previous embodiments depicted within the FIG. 7, FIG. 8, and FIG. 9.

There can be embodiments where the effective processing module 1020 does nothing more than take the conjugate of one or more of the inputs provided thereto. For example, in a communication system (such as the one depicted with reference to FIG. 11), the only processing required by the effective processing module 1020 with respect to the "data estimate 1012" is to provide the conjugate of the "data estimate 1012", in such case the "conjugate of the data estimate 1022" is merely the "conjugate" of the "data estimate 1012". Similarly, the only processing required by the effective processing module 1020 with respect to the "channel estimate 1011" is to provide the conjugate of the "channel estimate 1011", in such case the "conjugate of the effective channel estimate 1021" is merely the "conjugate" of the "channel estimate 1011".

Alternatively, within other communication system types such as a maximal ratio combining (MRC), the effective processing module 1020 may perform additional processing such as whitening of one or more of the inputs (the channel estimate 1011, the data estimate 1012, and the received signal component 1013) provided thereto, in addition to generating the conjugate of certain of the values as required.

In even another embodiment, such as a MIMO communication system, the effective processing module 1020 can perform processing such as reducing the received signals into individual stream components, performing equalization (e.g., zero forcing equalization), and whitening of one or more of the inputs (the channel estimate 1011, the data estimate 1012, and the received signal component 1013) provided thereto, in addition to generating the conjugate of certain of the values as required. For example, the effective processing module 1020 can perform decomposition of the channel estimate 1011, the data estimate 1012, and the received signal component 1013 into its corresponding single stream components from its multiple streams components that corresponding to more than one communication path within such a MIMO communication system.

It is noted that the arctangent processing module 1030 could alternatively simply receive an effective channel estimate and a data estimate from the effective processing module 1020. Then, the arctangent processing module 1030 could take the conjugates thereof to form the conjugate of the effective channel estimate 1021 and the conjugate of the data estimate 1022.

Generally speaking, to accommodate any of a wide variety of communication systems, the arctangent processing module 1030 is operable to operate on a at least three inputs: the first of which corresponds to a channel estimate, the second of which corresponds to a data estimate, and the third of which corresponds to a received signal component (e.g., a received symbol).

As one example, an apparatus that includes a processing module (with a memory coupled thereto) can be implemented to perform the following operations. For each data symbol of a plurality of data symbols, the processing module is operable to multiply a conjugate of a corresponding effective channel estimate, a conjugate of a corresponding data estimate, and a corresponding effective received signal component thereby generating a corresponding data product term. For each pilot symbol of a plurality of pilot symbols, the processing module is operable to multiply a conjugate of a corresponding effective channel estimate, a conjugate of a corresponding pilot symbol, and a corresponding effective received signal component thereby generating a corresponding pilot product term. Then, the processing module is operable to sum each data product term thereby generating a first summed term, multiply the first summed term by a first weighting term thereby generating a first weighted, summed term, sum each pilot product term thereby generating a second summed term, and multiply the second summed term by a second weighting term thereby generating a second weighted, summed term. The processing module is operable to add the first weighted, summed term and the second weighted, summed term thereby generating an argument term. The processing module is then operable to determine an arctangent of the argument term thereby generating an estimate of an angle between a constellation of at least one symbol of the plurality of data symbols and an expected constellation for the at least one symbol of the plurality of data symbols.

It is also noted that the angle estimation functionality and methods presented herein may be applied to many other types of communication systems including, but not limited to those depicted with reference to the following diagrams.

FIG. 11A is a diagram illustrating an embodiment of a single-input-single-output (SISO) communication system 1101. A transmitter (TX 1111) having a single transmit antenna communicates with a receiver (RX 1121) having a single receive antenna.

FIG. 11B is a diagram illustrating an embodiment of a multiple-input-multiple-output (MIMO) communication system 1102. A transmitter (TX 1112) having multiple transmit antennae communicates with a receiver (RX 1122) having multiple receive antennae. Looking only at 2 of the plurality of antennae at either end of the communication channel, a first antenna transmits A and a second antenna transmits B. At the RX 1122, a first antenna receives A'+B' and a second antenna receives A"+B". The RX 1122 includes the appropriate functionality to perform the extraction and generation of a signal that is a best estimate of the transmitted signal A and B.

FIG. 11C is a diagram illustrating an embodiment of a multiple-input-single-output (MISO) communication system 1103. A transmitter (TX 1113) having multiple transmit antennae communicates with a receiver (RX 1123) having a single receive antenna.

FIG. 11D is a diagram illustrating an embodiment of a single-input-multiple-output (SIMO) communication system 1104. A transmitter (TX 1114) having a single transmit antenna communicates with a receiver (RX 1124) having multiple receive antennae. A single-input-multiple-output (SIMO) communication system 1104 can be viewed as being the dual of a MISO communication system.

Figure 12:
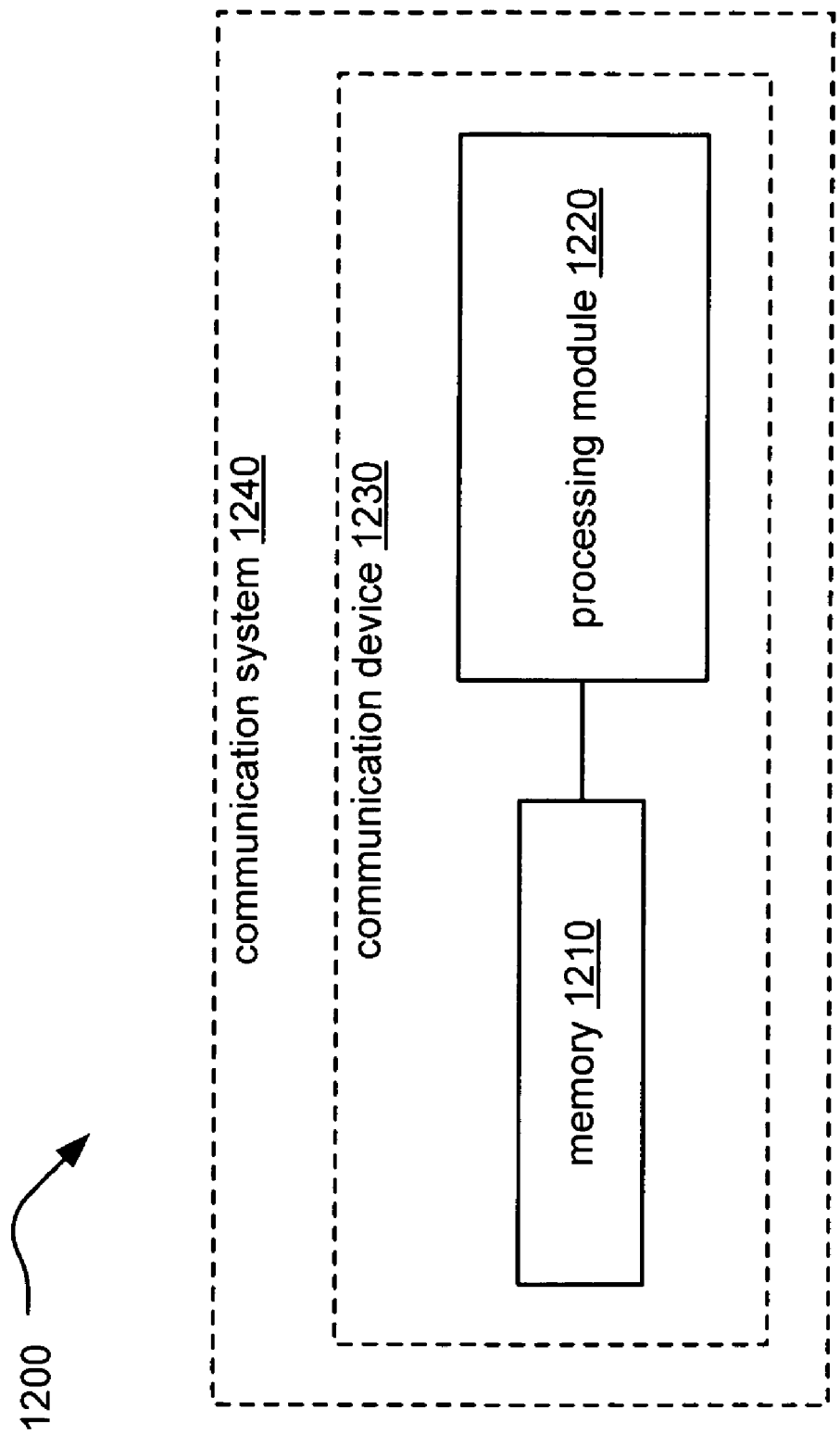
FIG. 12 is a diagram illustrating an embodiment of an apparatus that is operable to perform angle estimation.

FIG. 12 is a diagram illustrating an embodiment of an apparatus 1200 that is operable to perform angle estimation. The apparatus 1200 includes a processing module 1220, and a memory 1210. The memory 1210 is coupled to the processing module, and the memory 1210 is operable to store operational instructions that enable the processing module 1220 to perform a variety of functions. The processing module 1220 (serviced by the memory 1220) can be implemented as an apparatus capable to perform any of the functionality of any of the various modules and/or functional blocks described herein. For example, the processing module 1220 (serviced by the memory 1220) can be implemented as an apparatus capable to perform angle estimation in accordance with any of the various embodiments described above.

The processing module 1220 can be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 1210 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 1220 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

If desired in some embodiments, the apparatus 1200 can be any of a variety of communication devices 1230, or any part or portion of any such communication device 1230. Any such communication device that includes the apparatus 1200 can be implemented within any of a variety of communication systems 1240 as well.

Figure 13A:
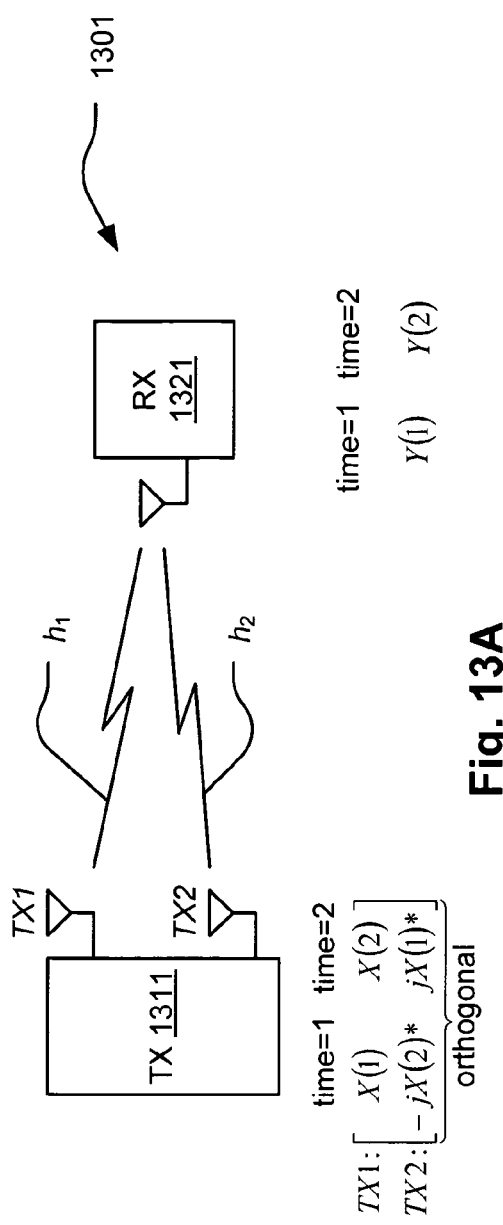
FIG. 13A is a diagram illustrating an embodiment of a 2×1 space-time block code (STBC) communication system.

FIG. 13A is a diagram illustrating an embodiment of a 2×1 space-time block code (STBC) communication system 1301. A transmitter (TX 1311) having 2 transmit antennae communicates with a receiver (RX 1321) having a single receive antenna. This is a communication system that employs 1 spatial stream and two transmit chains therein. Alternatively, these may be viewed as being two "space-time streams". When receiving a signal in this embodiment, the receiving communication device (RX 1321) is operable to form a received 2×1 STBC block and to make estimates of one or more information bits encoded therein. Additional and subsequent decoding processing (e.g., after performing STBC decoding processing) may also be made to estimates of the one or more information bits encoded within the received signal. For example, once the 2×1 STBC block has been formed, it may be passed to another decoder (e.g., an error correction code (ECC) decoder such as a turbo decoder, an LDPC (Low Density Parity Check) decoder, a Reed-Solomon (RS) decoder, other decoder, and/or combination thereof) that then performs decoding processing to make estimates of the one or more information bits encoded within the received signal.

It is noted that this formation is the creation of a modified receive signal (e.g., from the information received via the 1-stream and two transmit chains therein) from the raw (e.g., uncorrected) received signal.

For systems that have more transmit antennas than receive antennas, STBC can be used to increase the received SNR hence extending range. In an STBC scheme, the data that has been encoded using a space-time block code is split into N space-time streams which are then simultaneously transmitted via N transmit antennas/chains. At each receive antenna, the received signal is a linear superposition of the N transmitted signals impaired by noise. Due to the orthogonal property of space-time block code. maximum-likelihood decoding is easily achieved and is based only on simple linear processing at the receiver.

In general, besides the channel and noise, other impairments such as phase offsets are present. Common sources of phase offsets are phase noise and mixers. If left uncorrected, phase offsets will lead to performance degradation. It may be assumed in this embodiment that the phase noise at a communication device located at the transmitter end of the communication channel is correlated. It is generally accepted that the phase noise in the communication device at the receiver end of the communication channel is correlated.

Without loss of generality, the following details phase offset estimation for a 2×1 STBC OFDM-based system in the context of 802.11n. Since the pilot symbols which are known are not encoded using space-time block code, the phase offset estimation and subsequent correction are fairly simple.

Specifically, for every received symbol, the phase offset or angle estimate for each space-time stream (assumed to be the same here) is computed as follows:

$$\hat{\alpha}(n) = \angle \sum_{k \in S_p} Y_k(n)[P_{k,1}(n)h_1(n) + P_{k,2}(n)h_2(n)]*, \text{ or}$$

$$\hat{\alpha}(n) = \arctan\left[\sum_{k \in S_p} Y_k(n)[P_{k,1}(n)h_1(n) + P_{k,2}(n)h_2(n)]*\right], \text{ where:}$$

n: time index/received symbol index;
k: tone index; and
$S_p$: set of pilot tone indices.

Once the phase offset or angle estimate, â(n), is computed, then the phase correction processing on the received symbol, $Y_k(n)$, can be performed as follows:

$$Y_k(n) = Y_k(n)e^{-j\hat{\alpha}(n)}.$$

The angle estimation functionality and methods presented above are directly applicable to this 2×1 STBC communication system 1301.

Figure 13B:
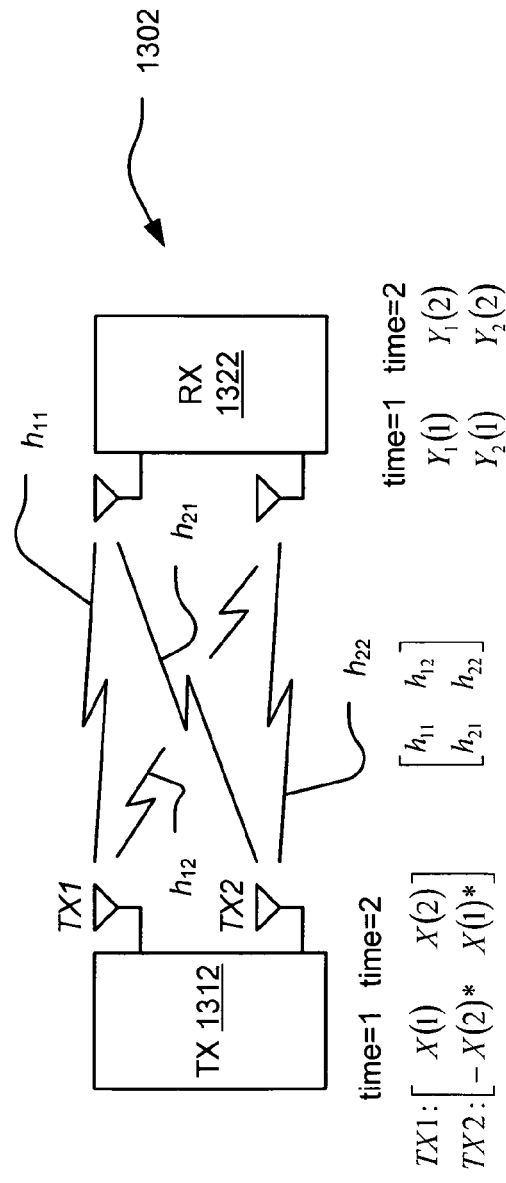
FIG. 13B is a schematic block diagram illustrating an embodiment of a 2×2 STBC communication system.

FIG. 13B is a schematic block diagram illustrating an embodiment of a 2×2 STBC communication system 1302. A transmitter (TX 1312) having 2 transmit antennae communicates with a receiver (RX 1322) having 2 receive antennae. The encoding of such a signal is the same as that for a 2×1 STBC transmission. That is the communication system still has 2 space-time streams or two transmit chains but only 1 spatial stream. The only difference is the number of receive antennas. The communication channel can be characterized by a 2×2 matrix as follows:

$$H = \begin{bmatrix} h_{11} & h_{12} \\ h_{21} & h_{22} \end{bmatrix}.$$

Various aspects of the invention operate by estimating the phase offset or angle estimate for each of the 2 space-time streams or 2 transmit chains (e.g., one phase offset or angle estimate for each of the 2 space-time streams or 2 transmit chains). During each time period, a phase offset or angle estimate for each of the 2 space-time streams is made (e.g., one for each antennae). However, based on certain considerations such as assuming that both of the phase offset or angle estimates for each of the 2 space-time streams are correlated, then a combined estimate can be generated using the two phase offset or angle estimates.

Various operations can be performed to generate a single phase offset or angle estimate (e.g., the combined estimate) from these two phase offset or angle estimates.

For example, the two phase offset or angle estimates (e.g., $\hat{a}_1$ for stream 1 and $\hat{a}_2$ for stream 2) can be averaged to generate a combined estimate (e.g., $\hat{a}$).

$$\hat{\alpha} = \frac{\hat{\alpha}_1 + \hat{\alpha}_2}{2}$$

Alternatively, one of the two phase offset or angle estimates can be selected to be the combined estimate.

$\hat{a}=\hat{a}_1$ or $\hat{a}=\hat{a}_2$, based on some decision making means, logic decision and/or other means.

Other means of combining the two phase offset or angle estimates can be employed (e.g., weighted combining) to generate the combined estimate.

$\hat{a}=k_1\hat{a}_1+k_2\hat{a}_2$, where each of $k_1$, $k_2$ is a number between 0 and 1, and $k_1+k_2=1$.

This weighted combining can be viewed as multiplying a first number by the first estimate thereby generating a first intermediate number, multiplying a second number by the second estimate thereby generating a second intermediate number, and then adding the first intermediate number and the second first intermediate number thereby generating the combined estimate.

When the combined estimate (e.g., $\hat{a}$) is generated, it can then be employed to correct each of the two received signal streams (e.g., correct each of $Y_{l,k}(1)=Y_{l,k}(1)e^{-j\hat{a}}$, $l=1,2$ at a time 1 as described below in one embodiment).

When receiving a signal in this embodiment, the receiving communication device (RX 1322) is operable to form a received 2×2 STBC block and to make estimates of one of more information bits encoded therein. Additional and subsequent decoding processing (e.g., after performing STBC decoding processing) may also be made to estimates of the one of more information bits encoded within the received signal. For example, once the 2×2 STBC block has been formed, it may be passed to another decoder (e.g., an ECC decoder such as a turbo decoder, an LDPC decoder, a RS decoder, other decoder, and/or combination thereof) that then performs decoding processing to make estimates of the one of more information bits encoded within the received signal.

When comparing this embodiment of FIG. 13B to that of FIG. 13A, it is noted that the encoding of such a signal employed within this embodiment of FIG. 13B is the same as that within the embodiment of FIG. 13B. That is to say, a transmitting device (e.g., TX 1311 in FIG. 13A and TX 1312 in FIG. 13B) performs "STBC encoding" of the signal in the same way for both a 2×1 STBC communication system or a 2×2 STBC communication system. The difference in this embodiment of a 2×2 STBC communication system 1302 is that the receiving device includes multiple antennae (e.g., 2 in this embodiment).

As with the previous embodiment, it may be assumed in this embodiment that the phase noise at a communication device located at the transmitter end of the communication channel is correlated. Also, the communication channel transfer function may be assumed to have the following form:

$$H = \begin{bmatrix} h_{11} & h_{12} \\ h_{21} & h_{22} \end{bmatrix}$$

Figure 14:
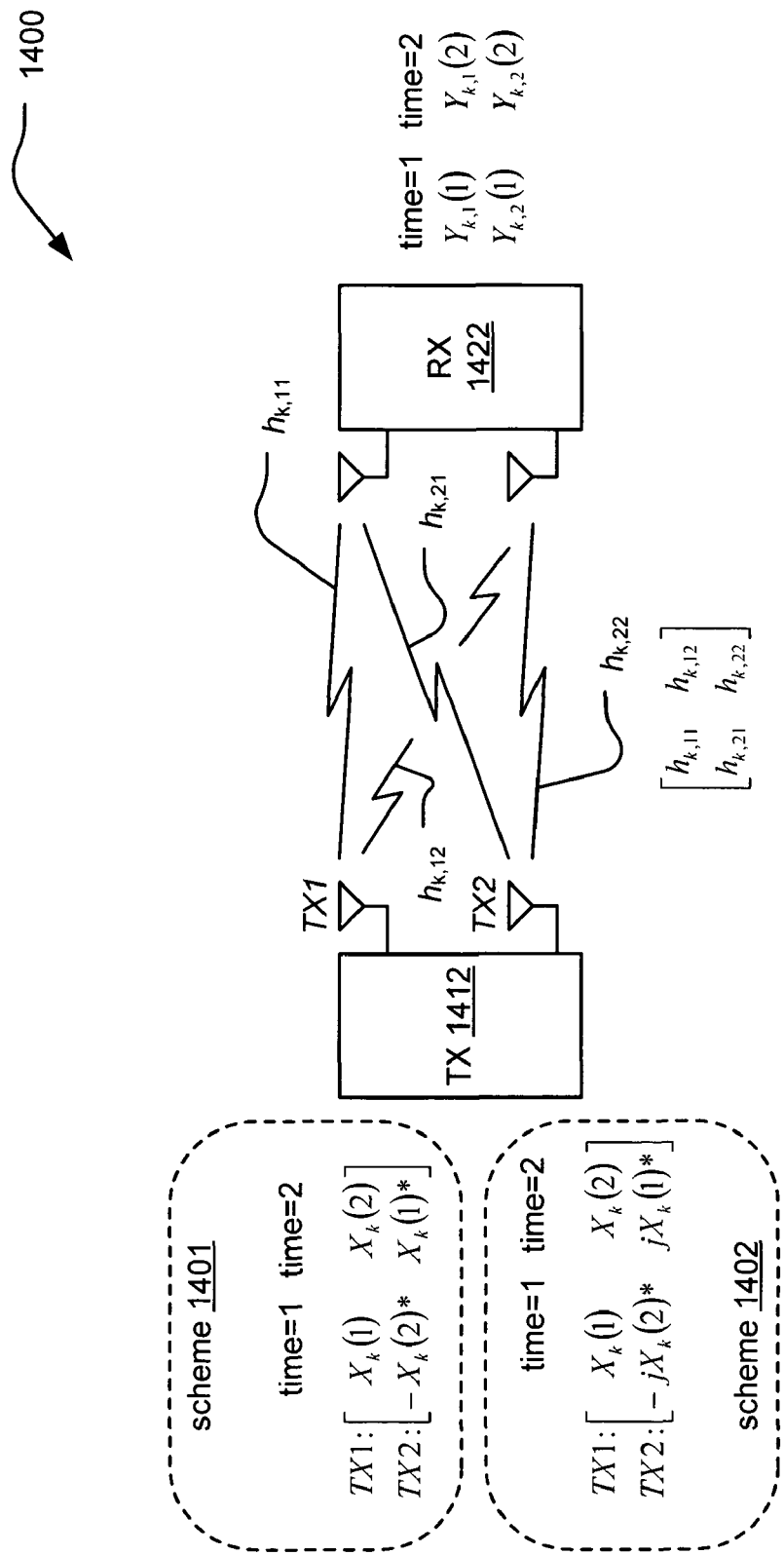
FIG. 14 is a schematic block diagram illustrating an alternative embodiment of a 2×2 STBC communication system.

FIG. 14 is a schematic block diagram illustrating an alternative embodiment of a 2×2 STBC communication system 1400. This embodiment also includes a transmitter (TX 1412) having 2 transmit antennae communicates with a receiver (RX 1422) having 2 receive antennae.

If desired, either one of 2 different orthogonal schemes depicted in FIG. 14 may be used (e.g., as shown by reference numerals 1401 and 1402).

In the FIG. 14, the variable, k, refers to the tone index (e.g., as in the context of OFDM).

Without loss of generality, the phase offset or angle estimate for each transmit chain may be performed for scheme 1401 as described below.

Since the phase noise at the transmitter and the receiver is assumed to be correlated, the received symbols at each time index can be slightly modified in the way represented in Row A of the following table.

To estimate the phase offset or angle estimate, $\alpha$, at time=1, the transmission may actually be treated as a regular 2×2 mode (i.e., a 2×2 MIMO communication system). Therefore, the angle/phase estimation techniques detailed above with respect to FIG. 9 and the written description thereof can be applied (e.g., as for a 2×2 MIMO communication system). After the phase offset or angle estimate has been estimated, it can be corrected for by doing the operations depicted below in Row B of the following table.

The same steps apply for estimating the phase offset or angle estimate, $\alpha$, at time=2.

The following table illustrates the transmission of these signals as a function of time.

|   | Time = 1 | Time = 2 |
|---|---|---|
| A | $Y_{1,k}(1) = (X_k(1)h_{11,k} - X_k(2)*h_{12,k})e^{j\alpha}$ | $Y_{1,k}(2) = (X_k(2)h_{11,k} - X_k(1)*h_{12,k})e^{j\beta}$ |
|   | $Y_{2,k}(1) = (X_k(1)h_{21,k} - X_k(2)*h_{22,k})e^{j\alpha}$ | $Y_{2,k}(2) = (X_k(2)h_{21,k} - X_k(1)*h_{22,k})e^{j\beta}$ |

-continued

| | | Time = 1 | Time = 2 |
|---|---|---|---|
| | | $\begin{bmatrix} Y_{1,k}(1) \\ Y_{2,k}(1) \end{bmatrix} = \begin{bmatrix} h_{11} & h_{12} \\ h_{21} & h_{22} \end{bmatrix} \begin{bmatrix} X(1) \\ X(2)* \end{bmatrix} e^{j\alpha}$ | $\begin{bmatrix} Y_{1,k}(2)* \\ Y_{2,k}(2)* \end{bmatrix} = \begin{bmatrix} h_{12}^* & h_{11}^* \\ h_{22}^* & h_{21}^* \end{bmatrix} \begin{bmatrix} X(1) \\ X(2)* \end{bmatrix} e^{j\beta}$ |
| | 1st EQ CM | ZFE on $Y_{1,k}(1), Y_{2,k}(1)$<br>$\hat{\alpha}$: obtained via 2 × 2 MIMO angle estimation technique | ZFE on $Y_{1,k}(2), Y_{2,k}(2)$<br>$\hat{\beta}$: obtained via 2 × 2 MIMO angle estimation technique |
| B | FD-Corr | $Y_{1,k}(1) = Y_{1,k}(1)e^{-j\hat{\alpha}}, l = 1, 2$ | $Y_{1,k}(2) = Y_{1,k}(2)e^{-j\hat{\beta}}, l = 1, 2$ |
| | 2nd EQ | $A_{1,k} = \frac{1}{|h_{11,k}|^2 + |h_{12,k}|^2} \begin{bmatrix} h_{11,k}^* \\ -h_{12,k}^* \end{bmatrix} Y_{1,k}(1)$  $B_{1,k} = \frac{1}{|h_{11,k}|^2 + |h_{12,k}|^2} \begin{bmatrix} h_{12,k} \\ h_{11,k} \end{bmatrix} Y_{1,k}^*(2)$ | |
| | | $A_{2,k} = \frac{1}{|h_{21,k}|^2 + |h_{22,k}|^2} \begin{bmatrix} h_{21,k}^* \\ -h_{22,k}^* \end{bmatrix} Y_{2,k}(1)$  $B_{2,k} = \frac{1}{|h_{21,k}|^2 + |h_{22,k}|^2} \begin{bmatrix} h_{22,k} \\ h_{21,k} \end{bmatrix} Y_{2,k}^*(2)$ | |

Thereafter, maximal ratio combining (MRC) combining, as described above, may be performed to do the combining of $A_{1,k}+B_{1,k}$ and $A_{2,k}+B_{2,k}$. The angle estimation functionality and methods presented above are also directly applicable to either one of the 2×2 STBC communication system 1302 in FIG. 13B or the 2×2 STBC communication system 1400 in FIG. 14.

Generally speaking, the same functionality and processing employed for estimating the phase offset or angle estimate of a received signal within a 2×2 MIMO communication system can be directly applied to a 2×2 STBC communication system.

It is noted that each symbol can be viewed as including a plurality of sub-symbols. For example, in one embodiment that is an OFDM embodiment, each sub-symbol can be viewed as being a tone. It is noted also that these sub-symbols which are pilot sub-symbols can be predetermined/known-beforehand.

It is also noted that in each of a 2×1 STBC communication system or a 2×2 STBC communication system, the same transmitting communication device can be employed (e.g., a communication device include two antennae).

The preceding discussion has presented a method and apparatus for estimating an angle between a constellation that corresponds to a received signal and a constellation that corresponds to an expected signal. In some embodiments, this may involve estimating an angle between a constellation that corresponds to an OFDM (Orthogonal Frequency Division Multiplexing) symbol of a signal received via one signal path in a communication channel and an expected constellation.

It is noted that the various modules (e.g., processing modules, and/or other modules, etc.) described herein may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention may also be described above with the aid of method steps illustrating the performance of specified functions and relationships thereof. The boundaries and sequence of these functional building blocks and method steps may been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus that is operable to perform angle estimation of a received signal that has been encoded using a 2×1 space-time block code (STBC), the apparatus comprising:
   a processing module; and
   a memory, coupled to the processing module, that is operable to store operational instructions that enable the processing module to:
   for each pilot sub-symbol of a plurality of pilot sub-symbols:
      multiply a conjugate of a corresponding first transmit chain channel estimate, a conjugate of a corresponding pilot sub-symbol transmitted across a first transmit chain, and a received signal component thereby generating a first product term;
      multiply a conjugate of a corresponding second transmit chain channel estimate, a conjugate of a corresponding pilot sub-symbol transmitted across a second transmit chain, and the received signal component thereby generating a second product term;
      add the first product term and the second product term thereby generating a corresponding summed term;
   sum each summed term thereby generating an argument term;
   determine an arctangent of the argument term thereby generating a first estimate of a first angle between a first constellation of a first symbol of a plurality of data symbols and a first expected constellation for the first symbol of the plurality of data symbols;
   use the first estimate to correct for any phase offset in the first symbol thereby generating a corrected first symbol;
   generate a second estimate of a second angle between a second constellation of a second symbol of the plurality of data symbols and a second expected constellation for the second symbol of the plurality of data symbols;
   use the second estimate to correct for any phase offset in the second symbol thereby generating a corrected second symbol; and
   form a received 2×1 STBC block that includes the corrected first symbol and the corrected second symbol.

2. The apparatus of claim 1, wherein:
   the received 2×1 STBC block subsequently undergoes decoding to make an estimate of at least one information bit encoded therein.

3. The apparatus of claim 1, wherein:
   the apparatus is a first communication device that couples to a second communication device via the first transmit chain and the second transmit chain;
   the second communication device includes a first antenna and a second antenna; and
   the received 2×1 STBC block subsequently undergoes decoding to make a first estimate of a first transmitted symbol that is transmitted from the first antenna and a second estimate of a second transmitted symbol that is transmitted from the second antenna.

4. The apparatus of claim 1, wherein:
   each pilot sub-symbol of a plurality of pilot sub-symbols is a predetermined sub-symbol.

5. The apparatus of claim 1, wherein:
   the plurality of data symbols is a plurality of OFDM (Orthogonal Frequency Division Multiplexing) symbols.

6. The apparatus of claim 1, wherein:
   the apparatus is operable to:
   receive the 2×1 STBC encoded signal from a communication channel that includes the first transmit chain and the second transmit chain; and
   perform front end-processing of the received 2×1 STBC encoded signal that includes at least one of frequency down converting, filtering, sampling, and baseband processing thereby generating a baseband signal that includes the plurality of data symbols.

7. The apparatus of claim 1, wherein:
   the apparatus is a wireless communication device.

8. An apparatus that is operable to perform angle estimation of a received signal that has been encoded using a 2×1 space-time block code (STBC), the apparatus comprising:
   a processing module; and
   a memory, coupled to the processing module, that is operable to store operational instructions that enable the processing module to:
   for each pilot tone of a plurality of pilot tones:
      multiply a conjugate of a corresponding first transmit chain channel estimate, a conjugate of a corresponding pilot tone transmitted across a first transmit chain, and a received signal component thereby generating a first product term;
      multiply a conjugate of a corresponding second transmit chain channel estimate, a conjugate of a corresponding pilot tone transmitted across a second transmit chain, and the received signal component thereby generating a second product term;
      add the first product term and the second product term thereby generating a corresponding summed term;
   sum each summed term thereby generating an argument term;
   determine an arctangent of the argument term thereby generating a first estimate of a first angle between a first constellation of a first symbol of a plurality of data symbols and a first expected constellation for the first symbol of the plurality of data symbols;
   use the first estimate to correct for any phase offset in the first symbol thereby generating a corrected first symbol;
   generate a second estimate of a second angle between a second constellation of a second symbol of the plurality of data symbols and a second expected constellation for the second symbol of the plurality of data symbols;
   use the second estimate to correct for any phase offset in the second symbol thereby generating a corrected second symbol; and
   form a received 2×1 STBC block that includes the corrected first symbol and the corrected second symbol.

9. The apparatus of claim 8, wherein:
   the received 2×1 STBC block subsequently undergoes decoding to make an estimate of at least one information bit encoded therein.

10. The apparatus of claim 8, wherein:
    the apparatus is a first communication device that couples to a second communication device via the first transmit chain and the second transmit chain;
    the second communication device includes a first antenna and a second antenna; and
    the received 2×1 STBC block subsequently undergoes decoding to make a first estimate of a first transmitted symbol that is transmitted from the first antenna and a second estimate of a second transmitted symbol that is transmitted from the second antenna.

11. The apparatus of claim 8, wherein:
each pilot sub-symbol of a plurality of pilot sub-symbols is a predetermined sub-symbol.

12. The apparatus of claim 8, wherein:
the plurality of data symbols is a plurality of OFDM (Orthogonal Frequency Division Multiplexing) symbols.

13. The apparatus of claim 8, wherein:
the apparatus is operable to:
receive the 2×1 STBC encoded signal from a communication channel that includes the first transmit chain and the second transmit chain; and
perform front end-processing of the received 2×1 STBC encoded signal that includes at least one of frequency down converting, filtering, sampling, and baseband processing thereby generating a baseband signal that includes the plurality of data symbols.

14. The apparatus of claim 8, wherein:
the apparatus is a wireless communication device.

15. An apparatus that is operable to perform angle estimation of a received signal that has been encoded using a 2×2 space-time block code (STBC), the apparatus comprising:
a processing module; and
a memory, coupled to the processing module, that is operable to store operational instructions that enable the processing module to:
for each data symbol of a plurality of data symbols of the 2×2 STBC encoded signal, multiply a conjugate of a corresponding effective channel estimate, a conjugate of a corresponding data estimate, and a corresponding effective received signal component thereby generating a corresponding data product term;
for each pilot symbol of a plurality of pilot symbols of the 2×2 STBC encoded signal, multiply a conjugate of a corresponding effective channel estimate, a conjugate of a corresponding pilot symbol, and a corresponding effective received signal component thereby generating a corresponding pilot product term;
sum each data product term thereby generating a first summed term;
multiply the first summed term by a first weighting term thereby generating a first weighted, summed term;
sum each pilot product term thereby generating a second summed term;
multiply the second summed term by a second weighting term thereby generating a second weighted, summed term;
add the first weighted, summed term and the second weighted, summed term thereby generating an argument term; and
determine an arctangent of the argument term thereby generating an estimate of an angle between a constellation of at least one symbol of the plurality of data symbols of the 2×2 STBC encoded signal and an expected constellation for the at least one symbol of the plurality of data symbols of the 2×2 STBC encoded signal.

16. The apparatus of claim 15, wherein:
the apparatus includes a first antenna and a second antenna;
the estimate of the angle between the constellation of the at least one symbol of the plurality of data symbols of the 2×2 STBC encoded signal and the expected constellation for the at least one symbol of the plurality of data symbols of the 2×2 STBC encoded signal is a first estimate of a first angle between a first constellation of a first symbol of the plurality of data symbols of the 2×2 STBC encoded signal and a first expected constellation for the first symbol of the plurality of data symbols of the 2×2 STBC encoded signal;

during a first time, the apparatus is operable to receive the first symbol at the first antenna and a second symbol at the second antenna;
during a second time, the apparatus is operable to receive a third symbol at the first antenna and a fourth symbol at the second antenna;
the memory, coupled to the processing module, is operable to store operational instructions that enable the processing module to:
generate a second estimate of a second angle between a second constellation of the second symbol of the plurality of data symbols of the 2×2 STBC encoded signal and a second expected constellation for the second symbol of the plurality of data symbols of the 2×2 STBC encoded signal;
process the first estimate and the second estimate thereby generating a first combined estimate;
use the first combined estimate to correct for any phase offset in the first symbol thereby generating a corrected first symbol and use the first combined estimate to correct for any phase offset in the second symbol thereby generating a corrected second symbol;
generate a third estimate of a third angle between a third constellation of the third symbol of the plurality of data symbols of the 2×2 STBC encoded signal and a third expected constellation for the third symbol of the plurality of data symbols of the 2×2 STBC encoded signal;
generate a fourth estimate of a fourth angle between a fourth constellation of the fourth symbol of the plurality of data symbols of the 2×2 STBC encoded signal and a fourth expected constellation for the fourth symbol of the plurality of data symbols of the 2×2 STBC encoded signal;
process the third estimate and the fourth estimate thereby generating a second combined estimate;
use the second combined estimate to correct for any phase offset in the third symbol thereby generating a corrected third symbol and use the second combined estimate to correct for any phase offset in the fourth symbol thereby generating a corrected fourth symbol; and
form a received 2×2 STBC block using the corrected first symbol, the corrected second symbol, the corrected third symbol, and the corrected fourth symbol.

17. The apparatus of claim 16, wherein:
the memory, coupled to the processing module, is operable to store operational instructions that enable the processing module to:
calculate an average of the first estimate and the second estimate thereby generating the first combined estimate.

18. The apparatus of claim 16, wherein:
the memory, coupled to the processing module, is operable to store operational instructions that enable the processing module to:
select the first estimate or the second estimate thereby generating the first combined estimate.

19. The apparatus of claim 16, wherein:
the memory, coupled to the processing module, is operable to store operational instructions that enable the processing module to:
multiply a first number by the first estimate thereby generating a first intermediate number;
multiply a second number by the second estimate thereby generating a second intermediate number;
add the first intermediate number and the second first intermediate number thereby generating the first combined estimate.

20. The apparatus of claim 15, wherein:
the first weighting term is a value between one and zero, inclusive; and
the second weighting term is a value between one and zero, inclusive.

21. The apparatus of claim 15, further comprising:
an angle correction module that is operable to:
correct each pilot symbol of the plurality of pilot symbols based on the estimate of the angle; and
correct each data symbol of the plurality of data symbols based on the estimate of the angle.

22. The apparatus of claim 15, wherein:
each pilot symbol of the plurality of pilot symbols is a predetermined symbol.

23. The apparatus of claim 15, wherein:
the plurality of data symbols is a plurality of OFDM (Orthogonal Frequency Division Multiplexing) symbols.

24. The apparatus of claim 15, wherein:
the apparatus is operable to:
receive the 2×2 STBC encoded signal from a communication channel; and
perform front end-processing of the received 2×2 STBC encoded signal that includes at least one of frequency down converting, filtering, sampling, and baseband processing thereby generating a baseband signal that includes the plurality of data symbols.

25. The apparatus of claim 15, wherein:
the apparatus is a wireless communication device.

26. An apparatus that is operable to perform angle estimation of a received signal that has been encoded using a 2×2 space-time block code (STBC), the apparatus comprising:
a processing module; and
a memory, coupled to the processing module, that is operable to store operational instructions that enable the processing module to:
for each data symbol of a plurality of data symbols of the 2×2 STBC encoded signal, multiply a conjugate of a corresponding effective channel estimate, a conjugate of a corresponding data estimate, and a corresponding effective received signal component thereby generating a corresponding data product term;
for each pilot symbol of a plurality of pilot symbols of the 2×2 STBC encoded signal, multiply a conjugate of a corresponding effective channel estimate, a conjugate of a corresponding pilot symbol, and a corresponding effective received signal component thereby generating a corresponding pilot product term;
sum each data product term thereby generating a first summed term;
multiply the first summed term by a first weighting term thereby generating a first weighted, summed term;
sum each pilot product term thereby generating a second summed term;
multiply the second summed term by a second weighting term thereby generating a second weighted, summed term;
add the first weighted, summed term and the second weighted, summed term thereby generating an argument term;
determine an arctangent of the argument term thereby generating a first estimate of a first angle between a first constellation of a first symbol of the plurality of data symbols of the 2×2 STBC encoded signal and a first expected constellation for the first symbol of the plurality of data symbols of the 2×2 STBC encoded signal;
generate a second estimate of a second angle between a second constellation of a second symbol of the plurality of data symbols of the 2×2 STBC encoded signal and a second expected constellation for the second symbol of the plurality of data symbols of the 2×2 STBC encoded signal;
process the first estimate and the second estimate thereby generating a first combined estimate;
use the first combined estimate to correct for any phase offset in the first symbol thereby generating a corrected first symbol and use the first combined estimate to correct for any phase offset in the second symbol thereby generating a corrected second symbol;
generate a third estimate of a third angle between a third constellation of the third symbol of the plurality of data symbols of the 2×2 STBC encoded signal and a third expected constellation for the third symbol of the plurality of data symbols of the 2×2 STBC encoded signal;
generate a fourth estimate of a fourth angle between a fourth constellation of the fourth symbol of the plurality of data symbols of the 2×2 STBC encoded signal and a fourth expected constellation for the fourth symbol of the plurality of data symbols of the 2×2 STBC encoded signal;
process the third estimate and the fourth estimate thereby generating a second combined estimate;
use the second combined estimate to correct for any phase offset in the third symbol thereby generating a corrected third symbol and use the second combined estimate to correct for any phase offset in the fourth symbol thereby generating a corrected fourth symbol; and
form a received 2×2 STBC block using the corrected first symbol, the corrected second symbol, the corrected third symbol, and the corrected fourth symbol; and wherein:
the received 2×2 STBC block subsequently undergoes decoding to make an estimate of at least one information bit encoded therein.

27. The apparatus of claim 26, wherein:
the memory, coupled to the processing module, is operable to store operational instructions that enable the processing module to:
calculate an average of the first estimate and the second estimate thereby generating the first combined estimate.

28. The apparatus of claim 26, wherein:
the memory, coupled to the processing module, is operable to store operational instructions that enable the processing module to:
select the first estimate or the second estimate thereby generating the first combined estimate.

29. The apparatus of claim 26, wherein:
the memory, coupled to the processing module, is operable to store operational instructions that enable the processing module to:
multiply a first number by the first estimate thereby generating a first intermediate number;
multiply a second number by the second estimate thereby generating a second intermediate number;
add the first intermediate number and the second first intermediate number thereby generating the first combined estimate.

30. The apparatus of claim 26, wherein:
the first weighting term is a value between one and zero, inclusive; and
the second weighting term is a value between one and zero, inclusive.

31. The apparatus of claim 26, further comprising:

an angle correction module that is operable to:

correct each pilot symbol of the plurality of pilot symbols based on the estimate of the angle; and correct each data symbol of the plurality of data symbols based on the estimate of the angle.

32. The apparatus of claim 26, wherein:

each pilot symbol of the plurality of pilot symbols is a predetermined symbol.

33. The apparatus of claim 26, wherein:

the plurality of data symbols is a plurality of OFDM (Orthogonal Frequency Division Multiplexing) symbols.

34. The apparatus of claim 26, wherein:

the apparatus is operable to:

receive the 2×2 STBC encoded signal from a communication channel; and perform front end-processing of the received 2×2 STBC encoded signal that includes at least one of frequency down converting, filtering, sampling, and baseband processing thereby generating a baseband signal that includes the plurality of data symbols.

35. The apparatus of claim 26, wherein:

the apparatus is a wireless communication device.

\* \* \* \* \*